US008634488B2

(12) United States Patent
Lee et al.

(10) Patent No.: US 8,634,488 B2
(45) Date of Patent: Jan. 21, 2014

(54) DATA TRANSMISSION METHOD AND APPARATUS BASED ON JOINT SPACE DIVISION MULTIPLE ACCESS TECHNOLOGY IN COLLABORATIVE DOWNLINK MIMO SYSTEM

(75) Inventors: In Ho Lee, Suwon-si (KR); Cheol Mun, Chungju-si (KR); Ju Ho Lee, Suwon-si (KR); Jin Kyu Han, Seoul (KR); Jong Gwan Yook, Seoul (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 472 days.

(21) Appl. No.: 12/844,524

(22) Filed: Jul. 27, 2010

(65) Prior Publication Data

US 2011/0019755 A1    Jan. 27, 2011

(30) Foreign Application Priority Data

Jul. 27, 2009  (KR) .................. 10-2009-0068435
Jan. 7, 2010   (KR) .................. 10-2010-0001131

(51) Int. Cl.
*H04B 7/02*      (2006.01)

(52) U.S. Cl.
USPC ........................................................ 375/267

(58) Field of Classification Search
None
See application file for complete search history.

(56) References Cited

U.S. PATENT DOCUMENTS

| | | | |
|---|---|---|---|
| 2006/0120477 A1* | 6/2006 | Shen et al. ............... | 375/267 |
| 2007/0160156 A1* | 7/2007 | Melzer et al. ............ | 375/260 |
| 2008/0075058 A1 | 3/2008 | Mundarath et al. | |
| 2008/0292012 A1* | 11/2008 | Kim et al. ................ | 375/260 |
| 2009/0034636 A1 | 2/2009 | Kotecha et al. | |
| 2009/0103486 A1 | 4/2009 | Hunukumbure et al. | |
| 2009/0154411 A1* | 6/2009 | Kikuchi et al. .......... | 370/329 |

OTHER PUBLICATIONS

Dai Wei et al., The Effect of Finite Rate Feedback on CDMA signature Optimization and MIMO Beamforming Vector Selection, Mar. 2006, conference on Information Sciences and Systems.*
Motorola, "Feedback Comparison in Supporting LTE-A MU-MIMO and CoMP Operations", R1-092635, 3GPP TSG RAN1#57bis, Jun. 24, 2009.
Motorola, "Coordinated Multi-Point Transmission—Coordinated Beamforming/Precoding and Some Performance Results", R1-090325, TSG-RAN WG1 #55bis, Jan. 8, 2009.

* cited by examiner

*Primary Examiner* — Chieh M Fan
*Assistant Examiner* — Wednel Cadeau
(74) *Attorney, Agent, or Firm* — The Farrell Law Firm, P.C.

(57) ABSTRACT

A channel condition information feedback method and apparatus are provided for a collaborative wireless communication network using a multiple input multiple output antenna system. The apparatus includes a downlink channel estimator that estimates channels of adjacent base stations, groups base stations from among the adjacent base stations that are capable of collaborative communication, and obtains a maximum singular vector to base stations belonged to a same group; and a vector selector which selects a weight vector most accurately representing the maximum singular vector and a complex variable most accurately representing the maximum singular vector in combination with the weight vector.

30 Claims, 10 Drawing Sheets

DATA TRANSMISSION METHOD AND APPARATUS BASED ON JOINT SPACE DIVISION MULTIPLE ACCESS TECHNOLOGY IN COLLABORATIVE DOWNLINK MIMO SYSTEM

PRIORITY

This application claims priority to applications filed with the Korean Intellectual Property Office on Jul. 27, 2009 and Jan. 7, 2010, which were assigned Serial Nos. 10-2009-0068435 and 10-2010-0001131, respectively, the contents of which are incorporated herein by reference.

BACKGROUND OF THE INVENTION

1. Field of the Invention

The present invention relates generally to wireless communications and, in particular, to a data transmission method and apparatus for maximizing the system throughput from multiple Collaborative Base Transceiver Stations (C-BTSs) to multiple Collaborative Access Terminals (C-ATs) based on a limited amount of feedback information in a collaborative Space Division Multiple Access (SDMA) Multiple Input Multiple Output (MIMO) system.

2. Description of the Related Art

MIMO has been provided to provide high speed and high quality data services in radio communication systems. MIMO technology operates with spatial processing based on the Channel State Information (CSI) between a transmitter and a receiver, such that the transmitter and receiver should know the CSI. Particularly in a downlink, the BTS should know the information on all of the channels between $n_T$ transmit antennas of the BTS and $n_R$ receive antennas of an Access Terminal (AT). In a Frequency Division Multiplexing (FDD) system in which the downlink and uplink are on different frequency bands, channel conditions between the downlink and downlink differ from each other such that the BTS depends on the downlink CSI that is estimated and fed back by the AT. Recently, codebook-based MIMO techniques have been provided to improve the spectral efficiency with a reduced amount of feedback information, rather than full CSI. The transmitter and receiver share a codebook of weight vectors, and the receiver estimates downlink channel and feeds back an index of the weight vector, maximizing the transmission performance to the transmitter.

Most conventional MIMO technologies have focused on how to avoid or suppress the intra-cell interferences, i.e., the interferences between data streams transmitted simultaneously in the same cell. Particularly in the conventional single cell SDMA techniques, each BTS forms as many beams as the number of transmit antennas in order to transmit data for the respective ATs. In this case, however, if the ATs receiving data through the Individual SDMA channels of respective BTSs are located in the overlapped service coverage area of the adjacent BTSs, inter-cell interference increases considerably, resulting in reduction of transmission data throughput of the system. Accordingly, there is a need to develop an improved SDMA technique for suppressing the Inter-Cell Interference (ICI) as well as intra-cell interference.

Collision Avoidance SDMA (CA-SDMA) is one of the more recently provided SDMA techniques in which each C-BTS selects a combination of precoding matrices from an SDMA codebook for a single cell and feeds back the selected precoding matrices combination along with Channel Quality Information (CQI). Each C-BTS selects the precoding matrices combination to be used by the C-BTSs that maximizes the C-BTS system transmission capacity and target C-ATs. That is, the CA-SDMA uses collaborative scheduling for suppressing ICI among the C-BTSs by preventing the collisions between the precoding matrices used by the C-BTSs while using codebook and transmission techniques for the conventional single cell SDMA. However, because the conventional SDMA technique developed for suppressing inter-cell interference is little different from the method for suppressing the intra-cell interference, this technique is not expected to suppress the inter-cell interference more effectively.

Accordingly, there is a need to develop a joint SDMA technique that is capable of maximizing simultaneous data transmission throughput from multiple C-BTSs to multiple C-ATs based on a collaboration of the C-BTSs and limited feedback information amount.

SUMMARY OF THE INVENTION

Accordingly, the present invention has been designed to overcome at least the above-described problems of the prior art, and provide the following advantages. An aspect of the present invention is to provide a data transmission/reception method and apparatus based on joint SDMA that is capable of maximizing a sum rate of simultaneous data transmission from multiple C-BTSs to multiple ATs in a collaborative radio communication system including a plurality of adjacent BTSs connected to each other through a high speed backhaul network.

In accordance with an aspect of the present invention, a channel condition information feedback method is provided for a terminal in a collaborative wireless communication network using a multiple input multiple output antenna system. The method includes grouping adjacent base stations that are capable of collaborative communication; acquiring a maximum singular vector by estimating downlink channels from base stations belonging to a same group; and feeding back a weight vector most accurately representing the maximum singular vector and a complex variable most accurately representing the maximum singular vector in combination with the weight vector.

In accordance with another aspect of the present invention, a channel condition information feedback apparatus is provided for a collaborative wireless communication network using a multiple input multiple output antenna system. The apparatus includes a downlink channel estimator that estimates channels of adjacent base stations, groups base stations from among the adjacent base stations that are capable of collaborative communication, and obtains a maximum singular vector to base stations belonged to a same group; and a vector selector which selects a weight vector most accurately representing the maximum singular vector and a complex variable most accurately representing the maximum singular vector in combination with the weight vector.

BRIEF DESCRIPTION OF THE DRAWINGS

The above and other aspects, features, and advantages of the present invention will be more apparent from the following detailed description, when taken in conjuncture with the accompanying drawings, in which.

DETAILED DESCRIPTION OF EMBODIMENTS OF THE INVENTION

Various embodiments of the present invention will now be described in detail with reference to the annexed drawings. In the following description, a detailed description of known functions and configurations incorporated herein has been omitted for the sake of clarity and conciseness.

The present invention provides a joint SDMA technology that is capable of maximizing a sum rate of downlink transmissions from C-BTSs to ATs with limited feedback information in a collaborative wireless communication network based on a MIMO antenna system.

In a collaborative wireless communication network using a MIMO antenna system according to an embodiment of the present invention, a method for channel information feedback of an AT includes grouping base stations available for the collaboration, estimating downlink channels of the base stations belonged to the same group and acquiring the maximum singular vector, and feeding back a weight vector representing the maximum singular vector and a complex variable representing the maximum singular vector.

In the collaborative wireless communication network using a MIMO antenna system according to an embodiment of the present invention, a channel status information feedback apparatus includes a downlink channel estimator for grouping the base stations available for the collaborative communication by estimating the channels of adjacent base stations, and a vector selector for selecting a weight vector representing the maximum singular vector and a complex variable representing the maximum singular vector and feeding back the selected weight vector and complex variable.

Figure 1:
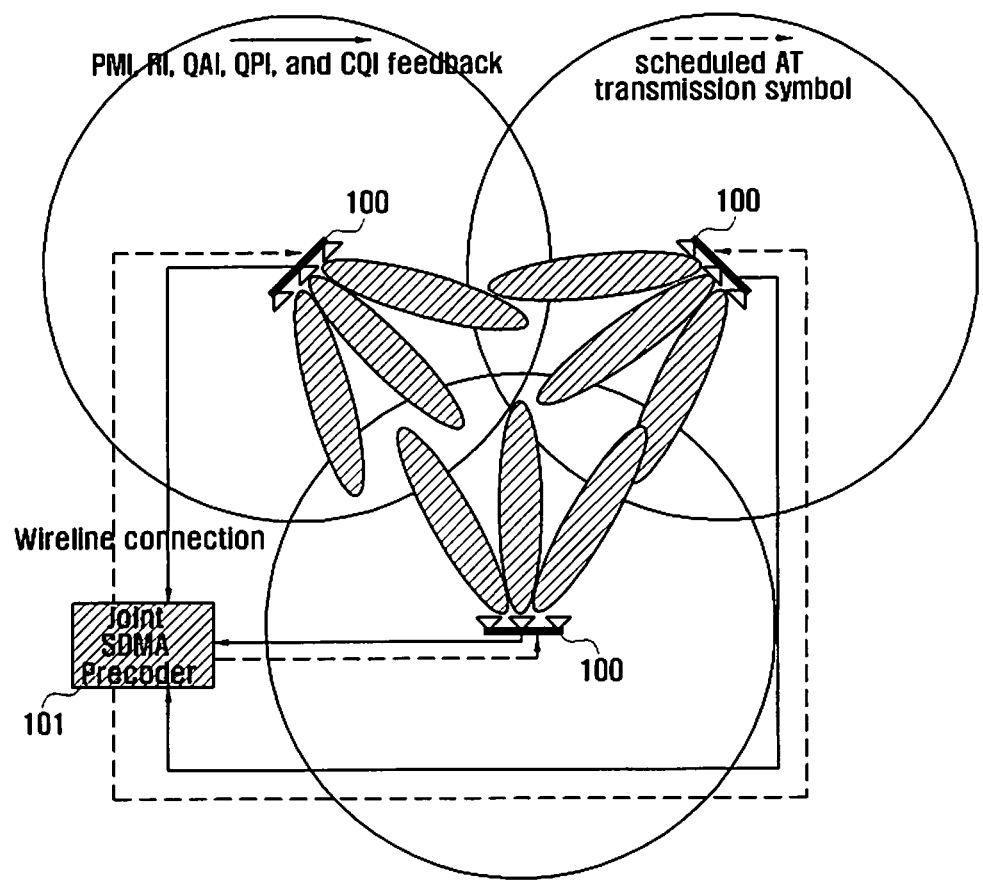
FIG. 1 is a diagram illustrating a principle of a joint SDMA technique according to an embodiment of the present invention.

FIG. 1 is a diagram illustrating a principle of a joint SDMA technique according to an embodiment of the present invention. Referring to FIG. 1, in the joint SDMA system, adjacent C-BTSs 100 connect to a joint SDMA precoder 101 through high speed backhaul communication links, and each C-AT (not shown) sends the C-BTSs maximum singular vector information of the collaborative downlink channel matrix as a limited amount of feedback information.

A C-AT feeds back a weight vector that most accurately represents a maximum singular vector of the downlink channel of each C-BTS 100 as index information of the vector selected from an SDMA codebook for a conventional single cell and complex variables that are optimally combined by being multiplied with a selected single cell weight vector per C-BTS 100 as quantized size and phase information or index information of a juncture vector selected from a juncture codebook. The quantized size and phase information or the juncture vector is selected so as to most closely reflect a maximum singular vector of a collaborative downlink channel matrix by optimally combining as many single cell weight vectors as the number of the C-BTSs 100.

Also, each C-AT feeds back the Signal-to-Interference and Noise Ratio (SINR) for signal reception as a part of the CQI information. Each C-BTS 100 transfers the feedback information collected from the C-ATs to the joint SDMA precoder 101 through a wired backhaul communication link, and the joint SDMA precoder 101 determines the C-ATs to which data is simultaneously transmitted within the corresponding cluster and a joint SDMA precoding matrix to be used by the C-ATs. Specifically, the joint SDMA precoder 101 multiplies the joint precoding weights to be used for the corresponding C-ATs with transmission data symbols of selected C-ATs and transfers the data symbols to the corresponding C-BTSs 100, and each C-BTS 100 transmits the corresponding data symbols through multiple antennas.

In order for all of the C-BTSs 100 to perform the joint SDMA on a plurality of C-ATs, a codebook including precoding matrices suitable for the joint SDMA channel environment is provided.

Until now, Random Vector Quantization (RVQ) and Maximum Angular Distance (MAD) algorithms have been provided for designing a single cell SDMA codebook, and their performance varies depending on the adopted channel environment. The RVQ codebook shows superior performance in an uncorrelated environment, while the MAD codebook is superior in a correlated environment.

The channel environment adopting the joint SDMA technology is characterized in that the channels of the transmit antennas of the same C-BTS are correlated but uncorrelated with the channels of the transmit antennas of other C-BTSs, i.e., the correlated channel environment and uncorrelated channel environment coexist. Accordingly, the conventional RVQ and MAD algorithms are not appropriate for the precoding matrices codebook design for the joint SDMA, and there is a need to develop a new precoding matrices codebook design algorithm suitable for a joint SDMA channel environment and a transceiver structure, feedback channels, and transmission/reception operations, which are appropriate for the new precoding matrices codebook design algorithm.

The joint SDMA system can change a precoding algorithm according to the number of C-ATs for data transmission. A unitary precoding algorithm performs scheduling based on accurate CQIs fed back from individual C-ATs in order to maximize a sum rate of the system based on multiuser diversity gain as the number of C-ATs increases. For data transmission for a small number of C-ATs, i.e., when the multiuser diversity gain of the scheduling is low, a non-unitary precoding algorithm, which is designed to minimize the interferences between ATs, is superior in system throughput as compared to the unitary precoding algorithm. Therefore, it is preferable that the joint SDMA system uses one of the unitary and non-unitary precoding algorithms selectively according to the number of C-ATs requesting data transmission. Accordingly, joint SDMA requires a codebook design algorithm for accurately feeding back a maximum singular vector of a collaborative channel matrix of each C-AT, transceiver structure, and operation processes for both the non-unitary and unitary precoding transmission algorithms, with the limited amount of the feedback information.

Consequently, a new codebook design algorithm will be described herein below, which is appropriate for a joint SDMA channel environment and capable of supporting both unitary and non-unitary precoding techniques, a transceiver structure, feedback channel, and transmission/reception operations corresponding to the new codebook design algorithm.

A. Collaborative Downlink Channel Characteristics of Joint SDMA

A downlink system of a cluster including M C-BTSs and K ATs is described below by way of example. It is assumed that each C-BTS uses $n_T$ transmit antennas and each AT uses $n_R$ receive antennas. The number of collaboration-available C-BTSs M can be changed adaptively depending on the conditions of the time-varying channels between the BTSs and ATs. Although the description below is directed to a cluster including three C-BTSs, i.e., M=3, this is merely for explanation purposes, and the present invention is not limited thereto but is applicable to clusters including more than three C-BTSs.

Assuming that x is an $Mn_T \times 1$ data symbol vector transmitted to $Mn_T$ ATs simultaneously through $Mn_T$ transmit antennas of M C-BTSs and $y_k$ is an $n_R \times 1$ received signal vector of $k^{th}$ AT and assuming frequency non-selective fading channel, the received signal can be expressed as follows:

$$y_k = \left[ \sqrt{\gamma_{k,1}} \, H_{k,1} \sqrt{\gamma_{k,2}} \, H_{k,2} \sqrt{\gamma_{k,3}} \, H_{k,3} \right] F_k x + n_k \quad (1)$$

$$\approx \sqrt{\tilde{\gamma}_k} \, \tilde{H}_k F_k x + n_k$$

In Equation (1), $\gamma_{k,m}$ denotes an average Signal-to-Noise Ratio (SNR) of a transmission from an $m^{th}$ C-BTS to a $k^{th}$ AT, (because the joint SDMA for the $k^{th}$ AT is performed with the C-BTSs having similar average SNRs to the $k^{th}$ AT, it is assumed that the average SNRs of the C-BTSs to the $k^{th}$ AT are similar to each other as $\tilde{\gamma}_k \approx \gamma\{_{k,m}\}_{m=1,2,3}$). $H_{k,m}$ denotes an $n_R \times n_T$ complex channel matrix from an $m^{th}$ C-BTS to $k^{th}$ AT, $\tilde{H}_k$ denotes an $n_R \times Mn_T$ collaborative channel matrix from M C-BTSs to kth AT and $\tilde{H}_k = [H_{k,1} \, H_{k,2} \, H_{k,3}]$, $n_k$ denotes an $n_R \times 1$ AWGN vector, and $F_k$ denotes an $Mn_T \times Mn_T$ transmission precoding matrix for performing joint precoding on x.

In the channel environment of the joint SDMA, channels from transmit antennas of a same C-BTS to an AT are correlated, but channels from transmit antennas of a different C-BTS to the same AT are uncorrelated. Consequently, a correlated channel environment and an uncorrelated channel environment coexist. Particularly when correlation of downlink channels between the C-BTSs and a $k^{th}$ AT, $\{H_{k,m}\}_{m=1,\ldots,M}$, is high, i.e., when downlink channels are highly correlated, the maximum singular vector of $\tilde{H}_k$, $\tilde{v}_{k,max}$, can be approximated as follows:

$$\tilde{v}_{k,max} \approx \begin{bmatrix} g_{k,1} v_{k,1,max} \\ g_{k,2} v_{k,2,max} \\ g_{k,3} v_{k,3,max} \end{bmatrix} \quad (2)$$

In Equation (2), $v_{k,m,max}$ of size $n_T \times 1$ denotes a maximum singular vector of a downlink channel $H_{k,m}$ from an $m^{th}$ C-BTS to a $k^{th}$ AT, $\{g_{k,m}\}_{m=1,\ldots,M}$ denotes a complex Gaussian random variable, i.e., $\sqrt{g_{k,1}^2 + g_{k,2}^2 + \ldots + g_{k,M}^2} = 1$.

Analyzing Equation (2), the maximum singular vector $\tilde{v}_{k,max}$ of the collaborative downlink channel is shown such that M $\{v_{k,m,max}\}_{m=1,2,3}$ multiplied by respective complex Gaussian random variables are accumulated vertically. That is, $\tilde{v}_{k,max}$ of size $Mn_T \times 1$ can be divided into M $\{v_{k,m,max}\}_{m=1,2,3}$ of size $n_T \times 1$ and complex Gaussian random variables $\{g_{k,m}\}_{m=1,\ldots,M}$ to be multiplied thereto. Here, the vector $g_k = [g_{k,1} \ldots g_{k,M}]^T$ having the complex Gaussian random variables $\{g_{k,m}\}_{m=1,\ldots,M}$ as its elements represents a singular vector of the downlink channels between the uncorrelated C-BTSs.

B. Unitary Precoding Transmission Technique and Non-Unitary Precoding Transmission Technique for Joint SDMA The joint SDMA transmission techniques can be divided into two categories: a non-unitary precoding technique that suppresses interference between data streams transmitted simultaneously using Zero-Forcing (ZF) or Minimum Mean Square Error (MMSE), and a unitary precoding technique that selects ATs so as to maximize multiuser diversity gain while minimizing interference between streams that are simultaneously transmitted using transmission weight vectors of a unitary precoding matrix. Specifically, if an $Mn_T \times Mn_T$ transmission precoding matrix $F_k$ for precoding the data vector x of Equation (1) fulfills Equation (3), below, it can be categorized into the unitary precoding transmission technique.

$$F_k^H F_k = I_{Mn_T \times Mn_T} \quad (3)$$

In Equation (3), $I_{Mn_T \times Mn_T}$ is a unitary matrix of size $Mn_T \times Mn_T$. That is, when $Mn_T$ vectors constituting the transmission precoding matrix $F_k$ are orthonormal, it is of the unitary precoding technique. Because the ATs intended for the simultaneous transmission select their respective column vectors from the transmission precoding matrix $F_k$, each AT can accurately calculate the interferences between ATs for the simultaneous transmission and feed back this calculation result to the scheduler. The scheduler performs scheduling based on the accurate CQIs fed back from the individual ATs so as to maximize the system transmission throughput with the multiuser diversity gain increasing in proportion to the number of the ATs.

In a system using the ZF or MMSE transmission precoding matrix for minimizing interference between the ATs simultaneously receiving data, the transmission precoding matrix $F_k$ does not fulfill the unitary matrix condition of Equation (3), resulting in the category of a non-unitary precoding transmission technique. The non-unitary precoding transmission technique uses the maximum singular vector information of the downlink channels that are fed back from the individual ATs and determines the ZF or MMSE transmission precoding matrix to minimize the interference between the ATs simultaneously receiving data. Accordingly, each AT estimates a minimum receivable SINR without knowing the precoding matrix to be used by the transmitter for actual data transmission and feeds backs the estimated SINR to the scheduler.

Because the scheduler selects the ATs to which the data is transmitted based on the inaccurate CQIs fed back from the ATs, it is difficult to maximize the system throughput with the multiuser diversity gain (which increases the system throughput by transmitting the data to the ATs having good CQIs instantly) despite the increase of the number of ATs. When the number of ATs to receive data is small, i.e., when the multiuser diversity gain from scheduling is not big enough, the non-unitary precoding technique for minimizing the interferences between ATs is superior to the unitary precoding technique in system throughput.

Accordingly, a need exists for a joint SDMA system that can select one of the non-unitary precoding transmission technique and unitary precoding transmission technique depending on the number of ATs intended for receiving data. For this purpose, there is a need of improved vector codebook design algorithm, transceiver structure, and operation process for accurately transmitting the maximum singular vector $\tilde{v}_{k,max}$ of the collaborative channel matrix $\tilde{H}_k$ of each AT. In order for the joint SDMA to use the unitary precoding transmission technique, a need exists for a matrix codebook design algorithm for forming the feedback vectors in the form of unitary transmission precoding matrices, transceiver structure, and their operation processes.

C. Joint SDMA System Using Non-Unitary Precoding Transmission Technique

In a joint SDMA system using a non-unitary precoding transmission technique, each AT should accurately feed back a downlink maximum singular vector. As described above, in order to accurately feed back the maximum singular vector $\tilde{v}_{k,max}$ of the collaborative channel matrix $\tilde{H}_k$ of each AT to the transmitter using a limited amount of feedback information, a vector codebook design algorithm, a transceiver structure, and an operation process for the joint SDMA using the non-unitary precoding transmission technique are required.

C.1 Vector Codebook Design for Joint SDMA Using Non-Unitary Precoding Technique

Because it is difficult to feed back time-varying uplink channel matrix information to a transmitter in an FDD radio communication systems using limited feedback information, it is preferred that the transmitter and receivers share a codebook including a plurality of weight vectors, and that the receiver selects an optimal weight vector from the codebook and feeds back the index corresponding to the selected weight vector to the transmitter.

In order to optimize the performance of the joint SDMA technique, the weight vectors in the codebook should be designed so as to represent the maximum singular vector $\tilde{v}_{k,max}$ of the collaborative channel matrix $\tilde{H}_k=[H_{k,1}\ H_{k,2}\ H_{k,3}]$ as accurately as possible. Particularly, the codebook is designed so as to be appropriate for the channel properties of the joint SDMA technique, i.e., both the correlated channel property between downlink channels of the same C-BTSs and uncorrelated channel property between the downlink channels of different C-BTSs.

In Equation (2), a maximum singular vector $\tilde{v}_{k,max}$ of the collaborative downlink channel is a vector of size $Mn_T \times 1$ having M $\{V_{k,m,max}\}_{m=1,2,3}$, as subvectors, to which complex Gaussian random variables are multiplied. The AT feeds back an index corresponding to the weight vector, which most accurately represents the singular vector of each C-BTS downlink channel, selected from a single cell vector codebook $\mathcal{G}_{single}$ and the values obtained by quantizing the M complex variables $\{g_{k,m}\}_{m=1,\ldots,M}$ to be multiplied with the selected M single cell weight vectors, such that it is possible to transmit the maximum singular vector $\tilde{v}_{k,max}$ of the collaborative downlink channel matrix using a limited amount of feedback information.

The single cell vector codebook $\mathcal{G}_{single}$ should be designed to represent singular vectors of the correlated individual C-BTS downlink channels and include a plurality of vectors of size $n_T \times 1$.

The conventionally provided knockdown precoder codebook or the single cell SDMA codebook employed for the current 3GPP LTE can be used. When using the single cell codebook and feedback channel for the 3GPP LTE, each AT calculates the maximum singular vector $v_{k,m,max}$ of each C-BTS with the estimation of pilot channel of the C-BTS, selects a vector representing the $v_{k,m,max}$ most accurately from $\mathcal{G}_{single}$, and feeds backs the selected vector to the corresponding C-BTS using the Precoding Matrix Indicator ($PMI_m$) and Rank Indicator ($RI_m$) to the $m^{th}$ C-BTS. The vector indicated by the $PMI_m$ and $RI_m$ of the $m^{th}$ C-BTS within the $\mathcal{G}_{single}$ is expressed as $\tilde{v}_{k,m,max}(PMI_m, RI_m)$.

The vectors $g_k=[g_{k,1}\ \ldots\ g_{k,M}]^T$ including the M complex Gaussian random variables $\{g_{k,m}\}_{m=1,\ldots,M}$ to be multiplied to selected M weight vectors $\{\tilde{v}_{k,m,max}(PMI_m, RI_m)\}_{m=1,\ldots,M}$, respectively, should be designed to most accurately represent the singular vectors of the downlink channels of the uncorrelated C-BTS, and $\|g_k\|=1$. In accordance with an embodiment of the present invention, two feedback methods, i.e., a juncture codebook-based feedback method and a quantized size and phase information feedback method, are provided.

Juncture Codebook-Based Feedback

In the juncture codebook-based feedback method, a juncture codebook includes vectors of size M×1 representing singular vectors $g_k=[g_{k,1}\ \ldots\ g_{k,M}]^T$ of the downlink channels of uncorrelated C-BTSs. A juncture vector is selected that most accurately represents the maximum singular vector $\tilde{v}_{k,max}$ of the collaborative channel matrix by being combined with the selected M weights $\{\tilde{v}_{k,m,max}(PMI_m, RI_m)\}_{m=1,\ldots,M}$ from $\mathcal{G}_{single}$ per C-BTS, as shown in Equation (2). The selected vector is then fed back.

The vectors of size M×1 included in $\mathcal{G}_{single}$ are designed to have isotropic distribution in the M-dimensional complex vector space and, for this purpose, a codebook designed in the conventional RVQ method or the Grassmannian codebook employed in IEEE802.16e can be used. The number of BTSs collaborating according to the instant channel gain variation between the AT and C-BTSs, i.e., M, can have a variable value. Accordingly, the juncture vector codebook $\mathcal{G}_{junct}^M$ should be designed as $\mathcal{G}_{junct}^2$, including juncture vectors of size 2×1 for M=2, and $\mathcal{G}_{junct}^3$, including juncture vectors of size 3×1 for M=3.

For example, if M=2, the vector codebook $\mathcal{G}_{junct}^2$ including 8 2×1 juncture vectors can be designed using the Grassmannian subspace packing method for designing Grassmannian codebook or the RVQ method as shown in Equation (4). The Grassmannian subspace packing method or RVQ method generates a plurality of independent and identically-distributed (i.i.d.) complex Gaussian random vectors of size 2×1 and selects 8 vectors having most uniform chordal distances between vectors in order to generate the vector codebook. This process requires large computation amount time.

$$G_{junct}^2 = \tag{4}$$

$$\left\{ \begin{bmatrix} 1 \\ 0 \end{bmatrix}, \begin{bmatrix} 0.79 \\ -0.58 + j0.18 \end{bmatrix}, \begin{bmatrix} 0.79 \\ 0.058 + j0.61 \end{bmatrix}, \begin{bmatrix} 0.794 \\ -0.30 - j0.53 \end{bmatrix}, \right.$$
$$\left. \begin{bmatrix} 0.794 \\ 0.60 + j0.07 \end{bmatrix}, \begin{bmatrix} 0.329 \\ 0.66 + j0.68 \end{bmatrix}, \begin{bmatrix} 0.511 \\ 0.48 - j0.72 \end{bmatrix}, \begin{bmatrix} 0.329 \\ -0.88 - j0.35 \end{bmatrix} \right\}$$

In Equation (4), the 8 column vectors included in $G_{junct}^2$ represents the vectors $g_k = [g_{k,1} \ldots g_{k,M}]^T$ including M complex Gaussian random variable $\{g_{k,m}\}_{m=1,\ldots,M}$ to be multiplied to the M single cell weight vectors $\{\tilde{v}_{k,m,max}(PMI_m, RI_m)\}_{m=1,\ldots,M}$ selected from $G_{single}$ per C-BTS. The AT selects a vector that most accurately represents the singular vector $\tilde{v}_{k,max}$ of the collaborative channel matrix by being combined with $\{\tilde{v}_{k,m,max}(PMI_m, RI_m)\}_{m=1,\ldots,M}$ from $G_{junct}$ and feeds back the selected vector to the transmitter using the Juncture Codebook Indicator (JCI) and the index of the vector selected from the codebook indicated by the JCI. JCI is an index for designating the codebook $G_{junct}$ used among M−1 juncture vector codebook $\{G_{junct}^m\}_{m=2,\ldots,M}$.

Assuming that the vector indicated by JCI and Junction Vector Index (JVI) is the second vector $G_{junct}^2$, the vector indicated by the feedback information $\{PMI_m\}_{m=1,2}$, $\{RI_m\}_{m=1,2}$, JCI, JVI at the $k^{th}$ AT can be expressed as follows:

$$\begin{bmatrix} 0.79 \tilde{v}_{k,1,max}(PMI_1, RI_1) \\ (0.058 + j0.61) \tilde{v}_{k,2,max}(PMI_2, RI_2) \end{bmatrix} \tag{5}$$

In Equation (5), because the weight vector $\tilde{v}_{k,1,max}(PMI_1, RI_1)$ selected per C-BTS and the complex coefficients multiplied to $\tilde{v}_{k,2,max}(PMI_2, RI_2)$ have size and phase values, it can accurately represent the maximum singular vector $\tilde{v}_{k,max}$ of the collaborative channel by adjusting and combining the sizes and phases of the weight vectors selected per single cell.

Quantized Size and Phase Information Feedback

In this method, each AT selects values most approximate to the size and phase values of M complex variables $\{g_{k,m}\}_{m=1,\ldots,M}$ representing the maximum singular vector $\tilde{v}k,max$ of the collaborative channel matrix in combination with the selected M weights $\{\tilde{v}_{k,m,max}(PMI_m, RI_m)\}_{m=1,\ldots,M}$ per C-BTS, as shown in Equation (2), from the size set A and phase set P including the quantized size values and phase values, respectively, and feeds back the selected values. The quantized size and phase values of respective A and P are calculated to be appropriate for the size and phase distributions of i.i.d. complex Gaussian random variables of which the average is 0 and the distribution is 1.

For example, the quantized size and phase sets are $\mathcal{A} = \{0, \sin(\pi/14), \sin(\pi/7), \sin(3\pi/14), \sin(2\pi/7), \sin(5\pi/14), \sin(3\pi/7), 1\}$ and $\mathcal{P} = \{0, \pi/4, \pi/2, 3\pi/4, \pi, 5\pi/4, 3\pi/2, 7\pi/4\}$ having 8 elements respectively, and each AT selects quantized size and phase values most accurately representing the $\tilde{v}_{k,max}$ in combination with the selected M weights $\{\tilde{v}_{k,m,max}(PMI_m, RI_m)\}_{m=1,\ldots,M}$ per C-BTS, as shown in Equation (2), from A and P, and feeds back the indices of the selected values using Quantized Amplitude Index ($QAI_m$) and Quantized Phase Index ($QPI_m$). If M=3, 3-bit QAIm and 3-bit QPIm are used to feed back $g_{k,m}$ to be multiplied to the weight $\tilde{v}_{k,m,max}(PMI_m, RI_m)$ selected from $G_{single}$ per C-BTS, such that a total of (3+3)×3=18 bits of feedback information is required for each AT to feed back $\{g_{k,m}\}_{m=1,\ldots,M}$. If M=2, it is possible to feed back $\{g_{k,m}\}_{m=1,\ldots,M}$ with a total of (3+3)×2=12 bits of feedback information using the same A and P.

When the number of collaborating BTSs, i.e., M, has variable value due to instant channel gain variation between AT and C-BTSs, the provided quantized phase and size values feedback method can use the same A and P for M having any value. In contrast, the provided juncture codebook-based feedback method designs different juncture vector codebooks according to the value of M and feeds back an index of the vector codebook selected among M juncture vector codebooks.

For the quantized phase and size values feedback method, the total number of expressible complex values is 8×8=64 from all the combinations of the elements belonged to the sets A and P; whereas, the juncture codebook-based feedback method can express a total of (8+8)=16 complex numbers, as shown in Equation (4). Accordingly, the quantized phase and size values feedback method can more accurately represent $\tilde{v}_{k,max}$ as compared to the juncture codebook-based feedback method.

C.2 Structure and Operation of Receiver for Joint SDMA Using Vector Codebook for Non-Unitary Precoding In this section, a structure and operation of an AT for supporting the joint SDMA method using a vector codebook for non-unitary precoding according to an embodiment of the present invention is described.

Figure 2:
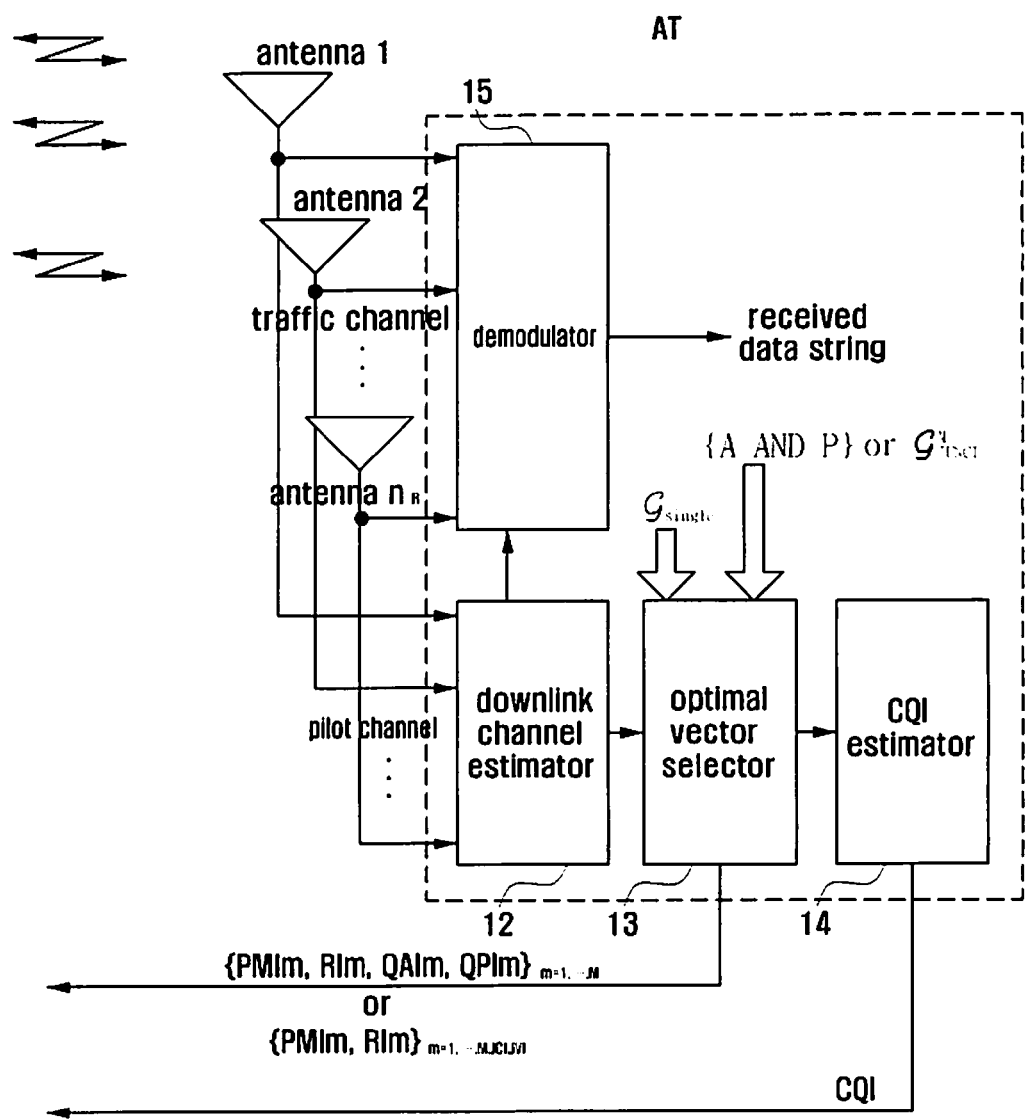
FIG. 2 illustrates a receiver of an AT for supporting a joint SDMA method using a vector codebook for non-unitary precoding according to an embodiment of the present invention.
Figure 3:
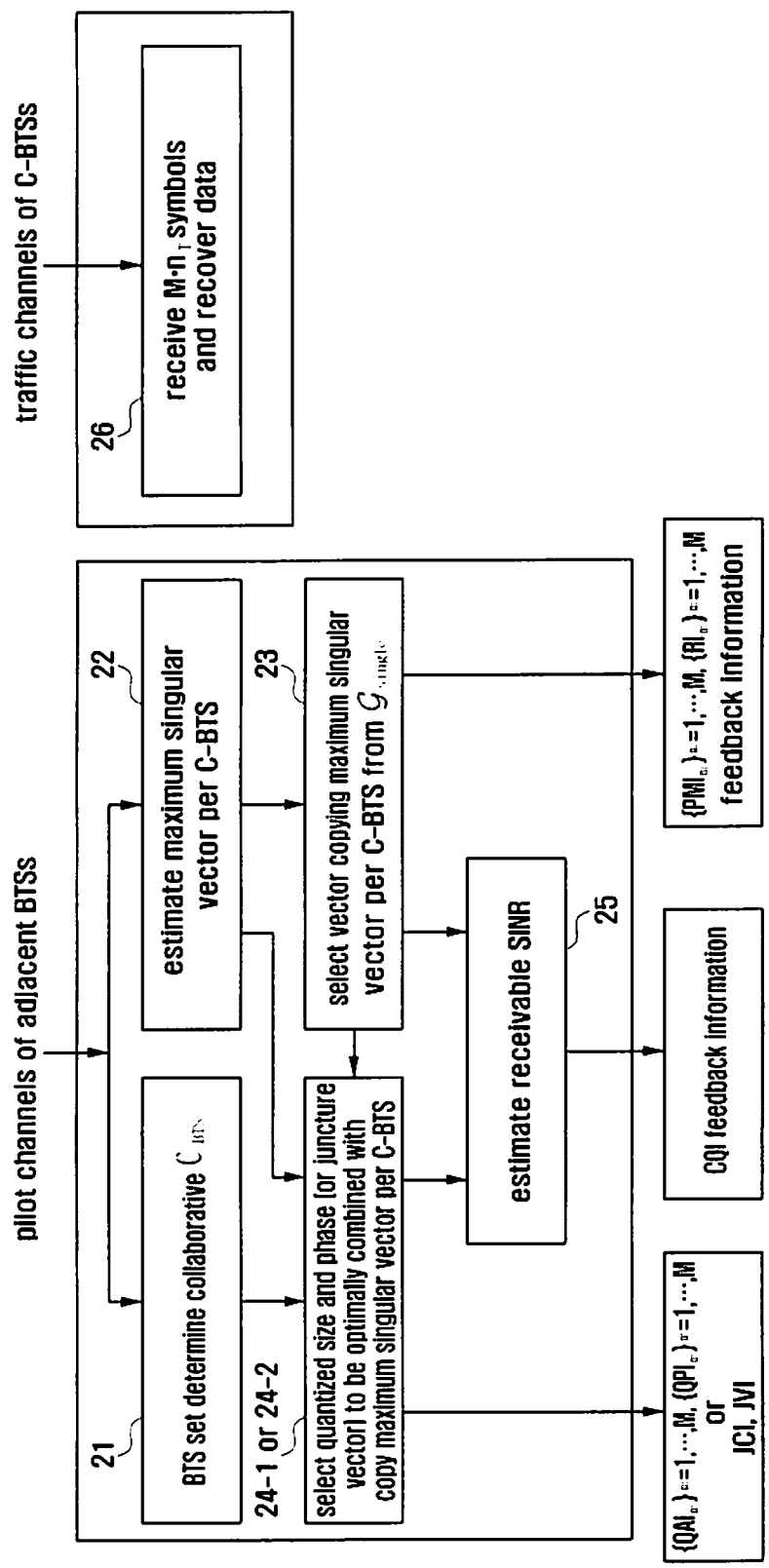
FIG. 3 is a flowchart illustrating a reception procedure of a joint SDMA method using a vector codebook according to an embodiment of the present invention.

FIG. 2 illustrates a receiver of an AT for supporting the joint SDMA method using a vector codebook for non-unitary precoding according to an embodiment of the present invention, and FIG. 3 is a flowchart illustrating a reception procedure of a joint SDMA method using a vector codebook according to an embodiment of the present invention.

Referring to FIGS. 2 and 3, at step 21, the downlink channel estimator 12 estimates pilot channels received from adjacent BTSs and determines a C-BTS set $\mathcal{C}_{BTS}$ including collaboration-available BTSs. To determine the C-BTS set $\mathcal{C}_{BTS}$ including M collaboration-available BTSs among $M^+$ adjacent BTSs, each AT calculates the multiplication $\beta_{k,m} = \gamma_{k,m} \lambda_{k,m}$ of average receivable SNR $\{\gamma_{k,m}\}_{m=1,\ldots,M^+}$ and instant channel gain $\{\lambda_{k,m}\}_{m=1,\ldots,M^+}$ using the pilot channels received from $M^+$ BTSs and determines whether the corresponding BTSs can participate in the collaboration using Equation (6):

$$\begin{cases} \dfrac{\beta_{k,m}}{\beta_{k,max}} \geq \beta_{th}, & \text{collaborative } BTS \\ \dfrac{\beta_{k,m}}{\beta_{k,max}} < \beta_{th}, & \text{non-collaborative } BTS \end{cases} \tag{6}$$

In Equation (6), $\beta_{k,max}$ denotes a maximum value within $\{\beta_{k,m}\}_{m=1,\ldots,M^+}$ of $M^+$ adjacent BTSs, and $\beta_{k,max} = \max\{\beta_{k,1}, \beta_{k,2}, \ldots \beta_{k,M^+}\}$. The instant channel gain $\{\lambda_{k,m}\}_{m=1,\ldots,M^+}$ is obtained from the maximum singular value of the downlink channel matrix between the AT and BTSs. When $\beta_{k,m}$ from the $m^{th}$ BTS is less than $\beta_{th}$ times of $\beta_{k,max}$, the mth BTS cannot participate in the collaboration and is then excluded from $C_{BTS}$. If $\beta_{th}=\frac{1}{2}$, the BTSs of which $\beta_{k,m}$ is less than 3 dB as compared to $\beta_{k,max}$ can be included in $C_{BTS}$.

At step 22, the downlink channel estimator 12 estimates downlink channel $\tilde{H}_k=[H_{k,1}\ H_{k,2}\ H_{k,3}]$ from M C-BTSs included in the determined $C_{BTS}$ to the $k^{th}$ AT and calculates the maximum singular vector $\tilde{v}_{k,max}$ of the collaborative channel matrix $\tilde{H}_k$. The kth AT estimate the downlink channels $\{H_{k,m}\}_{m=1,2,3}$ from the C-BTS and calculates the maximum singular vectors $\{v_{k,m,max}\}_{m=1,2,3}$ of the individual matrices.

The optimal vector selector 13 performs steps 23 and 24-1 or steps 23 and 24-2.

More specifically, at step 23, the optimal vector selector 13 selects a vector most accurately representing the maximum singular vector $v_{k,m,max}$ of the downlink channel matrix of $m^{th}$ C-BTS from a predetermined single cell vector codebook $G_{single}$ and feeds back the selected vector to the $m^{th}$ C-BTS using the Precoding Matrix Indicator ($PMI_m$) and Rank Indicator ($RI_m$) to the $m^{th}$ C-BTS. This process is performed on the M C-BTSs belonging to $C_{BTS}$.

At step 24-1, the optimal vector selector 13 selects a value most approximating the size value $\{|g_{k,m}|\}_{m=1,\ldots,M}$ of M complex variables $\{g_{k,m}\}_{m=1,\ldots,M}$, which can most accurately representing $\tilde{v}_{k,max}$ in optimal combination with M vectors indicated by $PMI_m$ and $RI_m$ selected within $G_{single}$ for M C-BTSs, from the set A having a predetermined size and feeds backs the Quantized Amplitude Index ($QAI_m$) as an index of the selected value. Also, the optimal vector selector 13 selects a value most approximating the phase value $\{\arg(g_{k,m})\}_{m=1,\ldots,M}$ of M complex Gaussian random variables $\{g_{k,m}\}_{m=1,\ldots,M}$ from a predetermined phase set P and feeds backs the Quantized Phase Index ($QPI_m$) as the index of the selected value.

Assuming the predetermined size set of $\mathcal{A}=\{0, \sin(\pi/14), \sin(\pi/7), \sin(3\pi/14), \sin(2\pi/7), \sin(5\pi/14), \sin(3\pi/7), 1\}$ and the phase set $\mathcal{P}=\{0, \pi/4, \pi/2, 3\pi/4, \pi, 5\pi/4, 3\pi/2, 7\pi/4\}$, the optimal vector selector 13 selects the values approximating the size value $|g_{k,m}|$ and the phase value $\arg(g_{k,m})$ for $g_{k,m}$ from respective A and P and feeds backs the $QAI_m$ and $QPI_m$ representing the selected values to the $m^{th}$ C-BTS.

The quantization and feedback process for $\{g_{k,m}\}_{m=1,\ldots,M}$ using $QAI_m$ and $QPI_m$ at step 24-1 can alternatively be performed at step 24-2 using a juncture vector codebook $G_{junct}^X$ designed for X having variant values.

More specifically, at step 24-2, the optimal vector selector 13 selects the juncture codebook $G_{junct}^M$ corresponding to the number of C-BTSs M within $C_{BTS}$ determined at step 21 among the juncture vector codebooks $\{G_{junct}^X\}_{M=2,\ldots,M^+}$ designed for X having variable values within the range from minimum 2 to maximum $M^+$, selects the juncture vectors capable of most accurately representing $\tilde{v}_{k,max}$ in optimal combination with the M vectors indicated by $PMI_m$ and $RI_m$ in $G_{single}$ per C-BTS within the selected $G_{junct}^M$, as shown in Equation (2), and feeds backs the JCI and JVI representing the selected values.

At step 25, when the M C-BTSs transmit data using the transmission weight vector of size $Mn_T \times 1$, as structured in Equation (2) using $\{PMI_m\}_{m=1,\ldots,M}$, $\{RI_m\}_{m=1,\ldots,M}$, $\{QAI_m\}_{m=1,\ldots,M}$, and $\{QPI_m\}_{m=1,\ldots,M}$ are selected at steps 23 and 24-1, the CQI estimator 14 of the $k^{th}$ AT estimates the receivable SINR, converts the estimation result to CQI information, and feeds back the CQI information to the C-BTSs.

When the M C-BTSs transmit data using the transmission weight vector of size $Mn_T \times 1$, as structured in Equation (2) using $\{PMI_m\}_{m=1,\ldots,M}$, $\{RI_m\}_{m=1,\ldots,M}$, JCI, and JVI are selected at steps 23 and 24-2, the CQI estimator 14 of the $k^{th}$ AT estimates receivable SINR, converts the SINR to CQI information, and feeds back the CQI information to the C-BTSs.

At step 26, the AT scheduled by the joint SDMA precoder decodes the $Mn_T$ symbols received on the traffic channel from M C-BTS and estimates the received data using decoder 15.

C.3 Structure and Operation of Transmitter for Joint SDMA Using Vector Codebook for Non-Unitary Precoding In this section, a structure and operation of a transmitter for supporting the joint SDMA technique using a vector codebook for non-unitary precoding according to an embodiment of the present invention is described.

Figure 4:
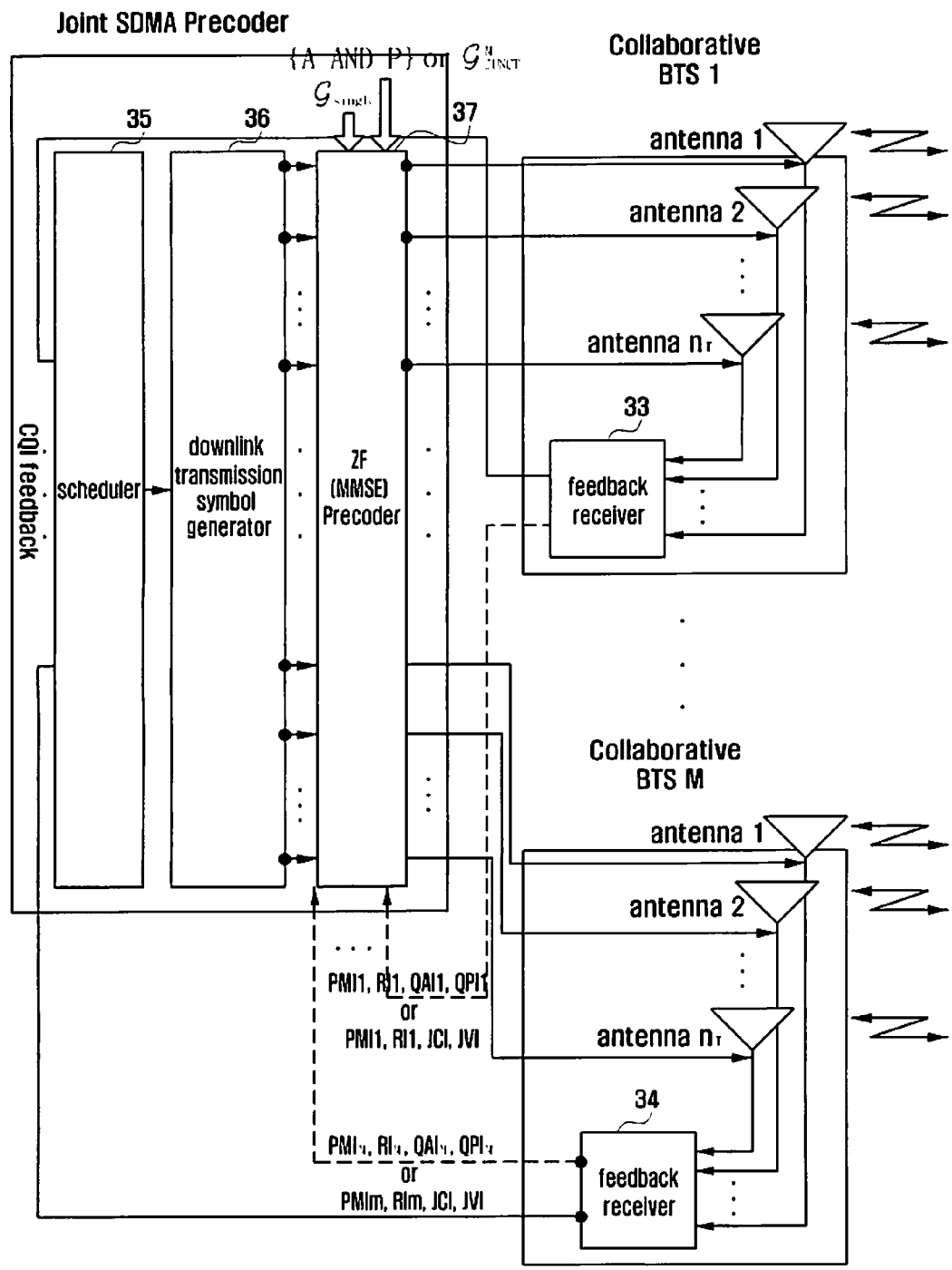
FIG. 4 illustrates a transmitter of an AT for supporting a joint SDMA method using a vector codebook for non-unitary precoding according to an embodiment of the present invention.
Figure 5:
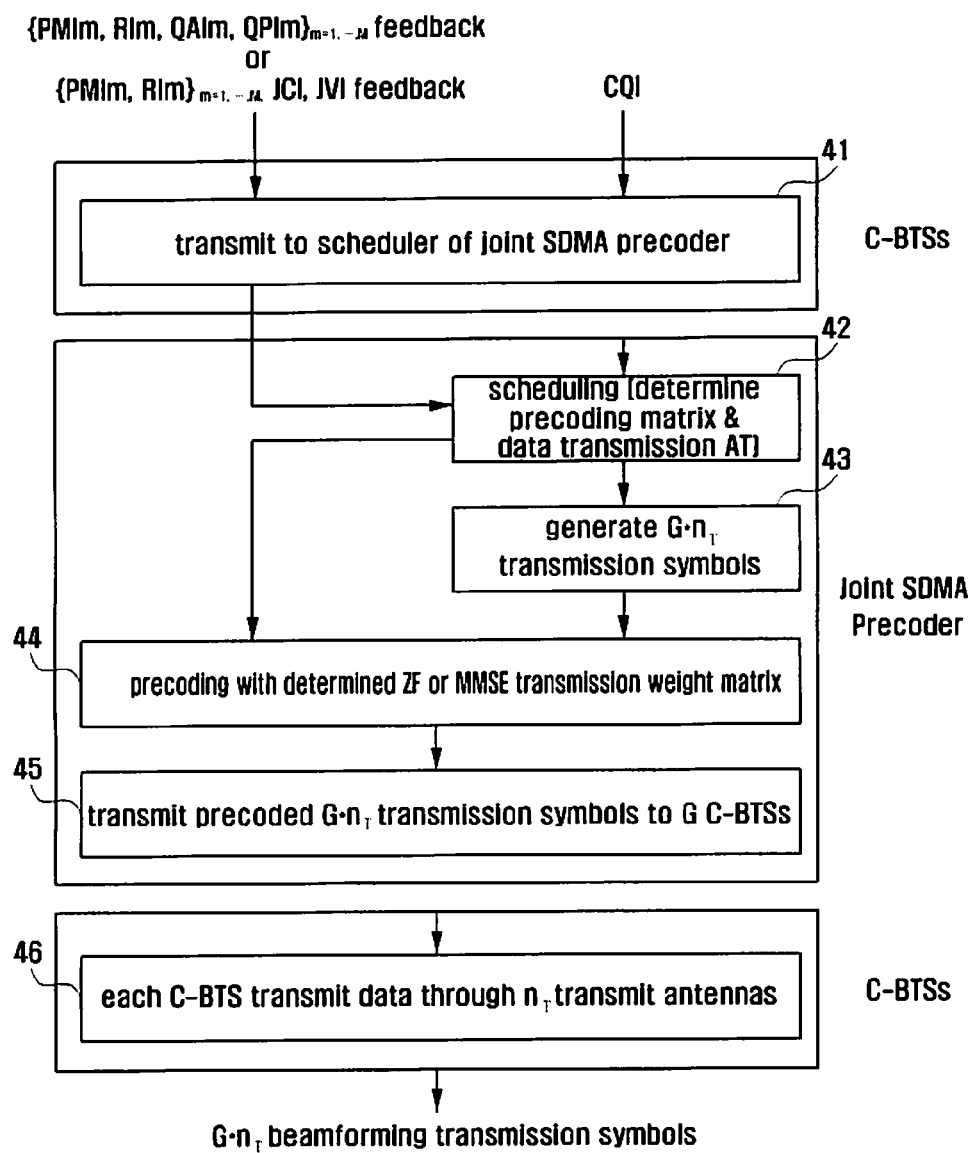
FIG. 5 is a flowchart illustrating a transmission procedure of a joint SDMA method using a vector codebook according to an embodiment of the present invention.

FIG. 4 illustrates a transmitter of an AT for supporting the joint SDMA method using a vector codebook for non-unitary precoding according to an embodiment of the present invention, and FIG. 5 is a flowchart illustrating a transmission procedure of the joint SDMA method using a vector codebook according to an exemplary embodiment of the present invention.

Referring to FIGS. 4 and 5, at step 41, the feedback information including $\{PMI_m\}_{m=1,\ldots,M}$, $\{RI_m\}_{m=1,\ldots,M}$, $\{QAI_m\}_{m=1,\ldots,M}$, and $\{QPI_m\}_{m=1,\ldots,M}$ or including $\{PMI_m\}_{m=1,\ldots,M}$, $\{RI_m\}_{m=1,\ldots,M}$, JCI, and JVI received by feedback receivers 33 and 34 of C-BTSs is transferred to the scheduler 35.

At step 42, the scheduler 35 determines a ZF (MMSE) transmission preceding matrix for use in simultaneous data transmission to M*nT ATs based on the feedback information about the maximum singular vectors of the ATs and related CQI feedback information.

At step 43, the downlink transmission symbol generator 36 generates data symbols to be transmitted with the ATs selected at step 42.

At step 44, the ZF (MMSE) precoder 37 multiplies the ZF (MMSE) preceding matrix determined at step 42 with the transmission symbols generated at step 43 to generate beamforming transmission symbols.

At step 45, the joint SDMA precoder transfers $Mn_T$ transmission symbols generated at step 44 to M C-BTSs by $n_T$ transmission symbols in sequential order.

At step 46, each C-BTS transmits $n_T$ transmission symbols received from the joint SDMA precoder through $n_T$ transmit antennas.

D. Joint SDMA System Using Unitary Precoding Transmission Technique

The unitary precoding transmission technique, as one of the SDMA techniques for transmitting data to multiple ATs, simultaneously performs scheduling the ATs in order to maximize multiuser diversity gain while minimizing interference between streams that are simultaneously transmitted using the transmission weight vectors of a unitary precoding matrix. In order to improve the performance of a joint SDMA using the unitary precoding transmission technique, each AT accurately feeds back the downlink maximum singular vectors to the transmitter, and the $Mn_T$ transmission weights for simultaneous data transmission are orthonormal. For the purpose in the joint SDMA using the unitary precoding transmission technique, a unitary matrix codebook including the unitary matrices of size $Mn_T \times Mn_T$ that are orthonormal with each other is used. Also, the unitary matrix codebook for use in the joint SDMA should be appropriately designed for the channel properties of the joint SDMA in which the downlink channels of the same C-BTS are highly correlated and the downlink channels of different C-BTS are uncorrelated.

In this section, a description is made of the unitary matrix codebook design algorithm, transmitter/receiver structure, and operations for the joint SDMA using a unitary precoding transmission technique with limited feedback information amount.

D.1 Unitary Matrix Codebook Design for Joint SDMA

For the joint SDMA employing unitary precoding, a matrix codebook $\mathcal{F}_{uni}$ including G unitary matrices $\{F_g\}_{g=1, 2, \ldots, G}$ of size $Mn_T \times Mn_T$ can be expressed as shown in Equation (7):

$$\mathcal{F}_{uni} = \{F_1, F_2, \ldots F_G\} \quad (7)$$

In Equation (7), the G matrices included in $\mathcal{F}_{uni}$ have unitary characteristics like $\{F_g^H F_g\}_{g=1, \ldots, G} = I_{n_T}$. The $Mn_T$ column vectors of each unitary matrix included in $F_{uni}$ should represent the maximum singular vector $\tilde{v}_{k,max}$ of the collaborative downlink channel $\tilde{H}_k = [H_{k,1} \ H_{k,2} \ H_{k,3}]$ as accurately as possible. That is, the column vectors of each unitary matrix should be designed such that the column vectors of size $Mn_T \times 1$ are formed by multiplying and accumulating M uncorrelated complex Gaussian random variables to the maximum singular vector of the channel matrix per BTS that are correlated, as shown in Equation (2).

In accordance with an embodiment of the present invention, a matrix form satisfying both the above-described conditions is shown below in Equation (8), where M=3 and $n_T$=2.

$$F_g = \begin{bmatrix} u_{l,1} \odot \begin{bmatrix} e_1^x \\ e_1^y \\ e_1^z \end{bmatrix} & u_{l,2} \odot \begin{bmatrix} e_1^x \\ e_1^y \\ e_1^z \end{bmatrix} & u_{l,3} \odot \begin{bmatrix} e_1^x \\ e_1^y \\ e_1^z \end{bmatrix} & u_{l',1} \odot \begin{bmatrix} e_2^x \\ e_2^y \\ e_2^z \end{bmatrix} & u_{l',2} \odot \begin{bmatrix} e_2^x \\ e_2^y \\ e_2^z \end{bmatrix} & u_{l',3} \odot \begin{bmatrix} e_2^x \\ e_2^y \\ e_2^z \end{bmatrix} \end{bmatrix} = \quad (8)$$

$$\begin{bmatrix} u_{l,1}^x e_1^x & u_{l,2}^x e_1^x & u_{l,3}^x e_1^x & u_{l',1}^x e_2^x & u_{l',2}^x e_2^x & u_{l',3}^x e_2^x \\ u_{l,1}^y e_1^y & u_{l,2}^y e_1^y & u_{l,3}^y e_1^y & u_{l',1}^y e_2^y & u_{l',2}^y e_2^y & u_{l',3}^y e_2^y \\ u_{l,1}^z e_1^z & u_{l,2}^z e_1^z & u_{l,3}^z e_1^z & u_{l',1}^z e_2^z & u_{l',2}^z e_2^z & u_{l',3}^z e_2^z \end{bmatrix}$$

In Equation (8), $e_1^\alpha$ and $e_2^\alpha$ are $n_T$ orthonormal vectors (in this example, $n_T$=2) selected to represent a maximum singular vector of the downlink channels from $\alpha^{th}$ C-BTS to each C-AT. Each C-AT calculates the maximum singular vector $v_{k,m,max}$ of each C-BTS through pilot channel estimation of each C-BTS, selects the vector most accurately representing the $v_{k,m,max}$ the single cell codebook $\mathcal{F}_{single}$ including the unitary matrices of size $n_T \times n_T$, and feeds back the selected vector using the Precoding Matrix Indicator ($PMI_m$) and the Rank Indicator ($RI_m$) of $m^{th}$ C-BTS to the corresponding C-BTS. This process is identical to the joint SDMA using non-unitary precoding technique described in section C, except that the vector most accurately representing $V_{k,m,max}$ is not selected from the vector codebook including vectors of size $n_T \times 1$ in the joint SDMA using non-unitary precoding technique, but from the unitary matrix codebook $\mathcal{F}_{single}$ for a single cell that includes the unitary matrices of size $n_T \times n_T$ in the joint SDMA using unitary precoding technique.

When using the unitary precoding technique, the transmission precoding matrix $E^\alpha = [e_1^\alpha \ e_2^\alpha]$ for use to transmit data to $n_T$ C-ATs selected from a single cell is controlled to become a unitary matrix in order to satisfy the first of the two conditions making the joint SDMA transmission precoding matrix $\{F_g\}_{g=1, 2, \ldots, G}$ for M C-BTSs a unitary matrix.

The unitary matrix codebook $\mathcal{F}_{single}$ for a single cell includes D unitary matrices of size $n_T \times n_T$, and the vectors of size $n_T \times 1$ belonging to each matrix are designed as shown in Equation (9) in order to represent the singular vectors of the correlated individual C-BTS downlink channels and be orthonormal with each other, i.e., fulfilling the unitary matrix properties.

$$\mathcal{F}_{single} = \{E_1, E_2, \ldots E_D\}, \text{ where } E_d^H E_d = I_{n_T} \text{ for } d=1, \ldots, D. \quad (9)$$

The single cell unitary matrix codebook $\mathcal{F}_{single}$ should be designed to maximize the SDMA performance in correlated single cell downlink channels. For this purpose, the knockdown precoder codebook provided for single cell or the single cell SDMA codebook employed in the current 3GPP LTE can be used.

The $M \times n_T$ column vectors included in the unitary precoding matrix $F_g$ of Equation (8) are the result of $\odot$ vector operations of the juncture unitary matrix $U_l = [u_{l,1} \ u_{l,2} \ u_{l,3}]$ of size $M \times M$, column vectors of $U_{l'} = [u_{l',1} \ u_{l',2} \ u_{l',3}]$, and the vectors $\{[e_n^x e_n^y e_n^z]^T\}_{n=1,2}$ of size $Mn_T \times 1$ as accumulation of transmission precoding vectors selected M cells. Here, $\odot$ vector operations can be defined as shown in Equation (10).

$$a \odot \begin{bmatrix} b \\ c \\ d \end{bmatrix} = \begin{bmatrix} a_1 \\ a_2 \\ a_3 \end{bmatrix} \odot \begin{bmatrix} b \\ c \\ d \end{bmatrix} = \begin{bmatrix} a_1 b \\ a_2 c \\ a_3 d \end{bmatrix} \quad (10)$$

In Equation (10), the juncture unitary precoding matrices $U_l$ and $U_{l'}$ are selected from the juncture unitary matrix codebook $\mathcal{F}_{junct}$ and should be designed to have the following characteristics. $U_l$ and $U_{l'}$ having respective column vectors $\{u_{l,m}\}_{m=1, \ldots, M}$ and $\{u_{l',m}\}_{m=1, \ldots, M}$ represent the singular vectors of the downlink channels of M uncorrelated C-BTSs and are orthonormal with each other. A juncture matrix codebook $\mathcal{F}_{junct}$ including Q unitary matrices having such characteristics is shown in Equation (11).

$$\mathcal{F}_{junct} = \{U_1, U_2, \ldots U_Q\}, \text{ where } U_q^H U_q = I_M \text{ for } q=1, \ldots, Q. \quad (11)$$

In Equation (11), the vectors of size $M \times 1$ that belong to each unitary matrix included in $\mathcal{F}_{junct}$ should be designed to have isotropic distribution in an M-dimensional complex unit sphere, and thus, the unitary matrix codebook designed by the conventional Random Vector Quantization (RVQ) method or the Grassmannian codebook employed in IEEE802.16e can be used. The Grassmannian subspace packing method or RVQ method generates a plurality of i.i.d. complex Gaussian random matrices of size $M \times M$, selects Q matrices, of which chordal distances are mostly uniform, from the complex Gaussian random matrices, and generates the juncture matrix codebook $\mathcal{F}_{junct}$ with the Q matrices. In order to support various MIMO operations of the joint SDMA, the following matrices shown in Equation (12) can be added to $\mathcal{F}_{junct}$.

$$I = \begin{bmatrix} 1 & 0 & 0 \\ 0 & 1 & 0 \\ 0 & 0 & 1 \end{bmatrix}, \quad (12)$$

-continued $$0 = \begin{bmatrix} 0 & 0 & 0 \\ 0 & 0 & 0 \\ 0 & 0 & 0 \end{bmatrix}$$

In order to form the unitary precoding matrix $F_g$ of size $Mn_T \times Mn_T$, $n_T$ (e.g., two) juncture unitary precoding matrices are selected. When I is selected as the juncture unitary precoding matrix, the single cell MIMO operation is performed without joint transmission of the C-BTSs. When 0 is selected as one juncture unitary precoding matrix, the number of streams transmitted simultaneously decreases from $Mn_T$ to $(M-1)n_T$ such that it is possible to adjust the transmission rank.

As described above, the codebook $\mathcal{F}_{uni}$ for the joint SDMA using the unitary precoding technique including the unitary matrices of size $Mn_T \times Mn_T$ that are formed by combining the single cell unitary matrix codebook including unitary matrices of size $n_T \times n_T$ and the juncture matrix codebook $\mathcal{F}_{junct}$ including unitary matrices of size $M \times M$ have the following characteristics.

First, the column vectors of the unitary matrices of size $Mn_T \times Mn_T$ included in $\mathcal{F}_{uni}$ can represent a maximum singular vector $\tilde{v}_{k,max}$ of collaborative downlink channel $\tilde{H}_k = [H_{k,1} \; H_{k,2} \; H_{k,3}]$ in the same performance as the codebook design method for non-unitary precoding provided in section C. Also, because the $Mn_T$ weight vectors multiplied to the $Mn_T$ data streams that are simultaneously transmitted are orthonormal with each other, each C-AT accurately measures CQI under the assumption that other C-ATs to which the data are transmitted simultaneously use the same precoding matrix, thereby maximizing multiuser diversity gain.

The provided unitary matrix codebook for joint SDMA can feed back the maximum singular vector of the collaborative channel matrix of each AT to the transmitter as in the non-unitary matrix codebook provided in section C, and the vectors to be fed back can be formed as unitary transmission precoding matrix in order to operate in accordance with a non-unitary precoding technique, when the number of ATs to which the data are transmitted is small, and accordance with a unitary precoding technique, when the number of ATs increases.

D.2 Structure and Operation of Receiver for Joint SDMA Using Unitary Precoding

In this section, a structure and operation of an AT for performing the joint SDMA method using unitary precoding matrix codebook according to an embodiment of the present invention is described.

Figure 6:
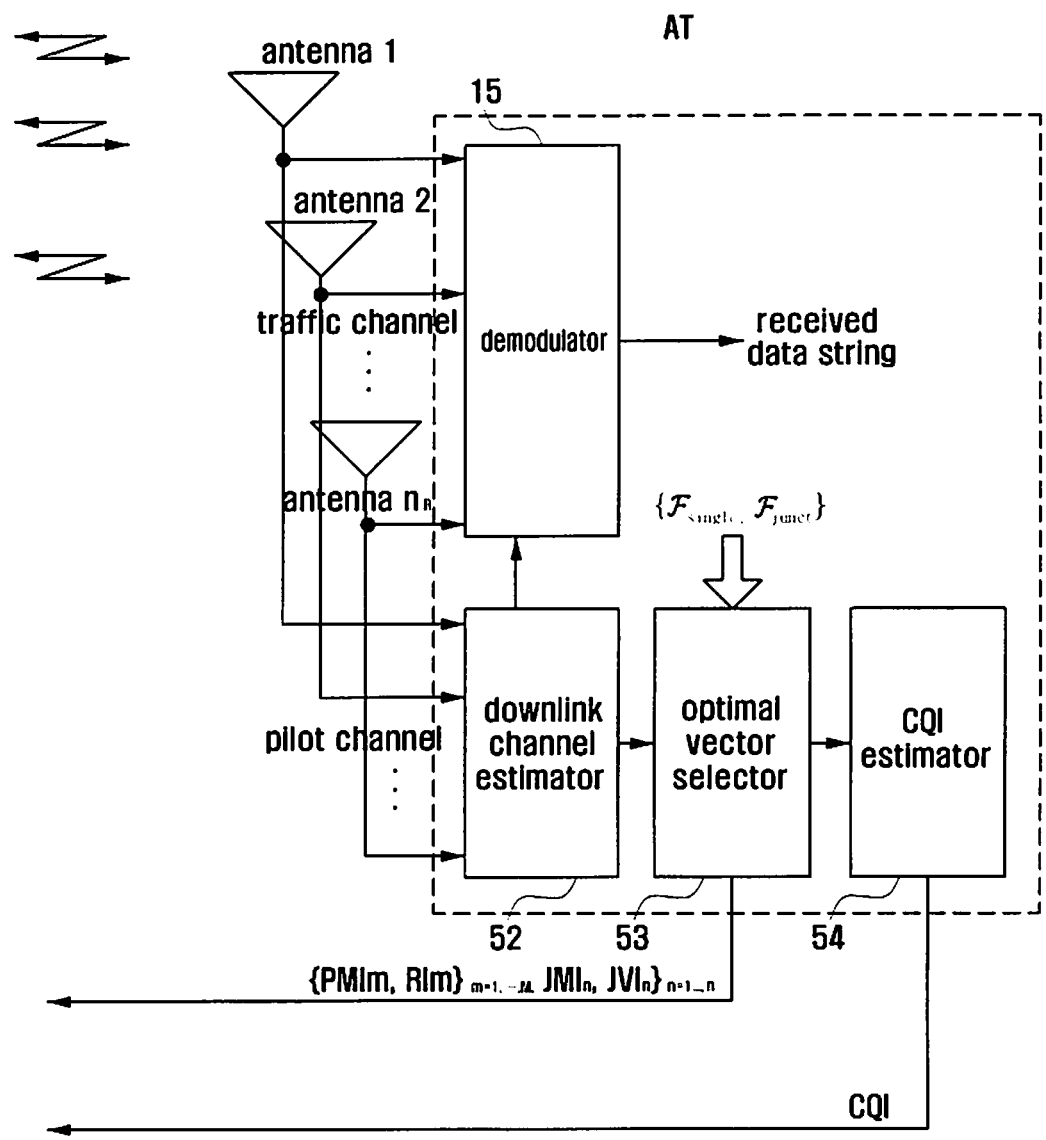
FIG. 6 illustrates a receiver of an AT for supporting a joint SDMA method using a unitary precoding matrix codebook according to an embodiment of the present invention.
Figure 7:
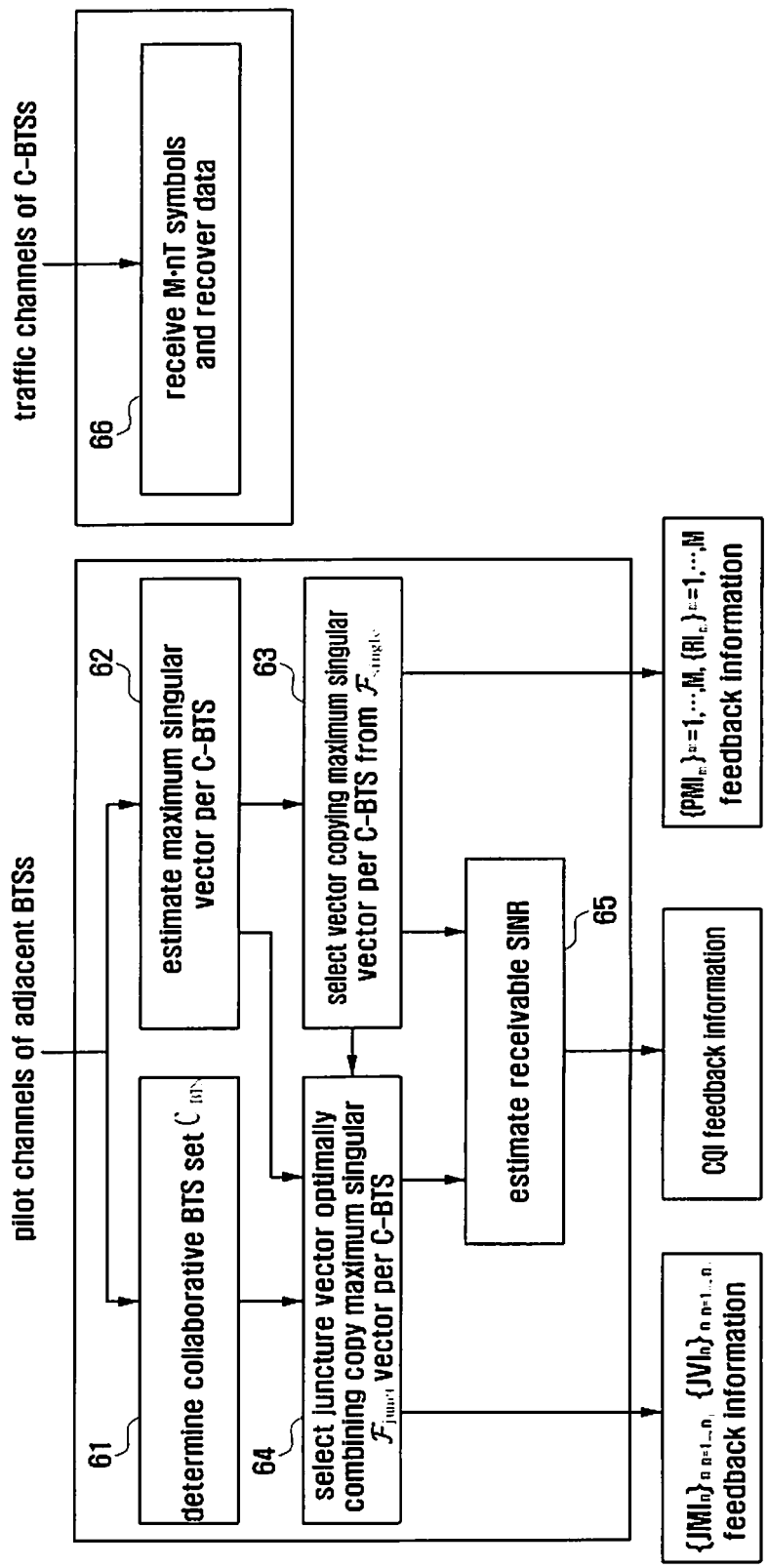
FIG. 7 is a flowchart illustrating a reception procedure of a joint SDMA method using a matrix codebook according to an embodiment of the present invention.

FIG. 6 illustrates a receiver of an AT for supporting the joint SDMA method using a unitary precoding matrix codebook according to an embodiment of the present invention, and FIG. 7 is a flowchart illustrating a reception procedure of the joint SDMA method using the matrix codebook according to an embodiment of the present invention.

Referring to FIGS. 6 and 7, at step 61, the downlink channel estimator 52 estimates pilot channels received from adjacent BTSs and determines the C-BTS set $\mathcal{C}_{BTS}$ including collaboration-available BTSs. The detailed process is identical with that of step 21 in FIG. 3, as described above.

At step 62, the downlink channel estimator 52 estimates the downlink channels $\tilde{H}_k = [H_{k,1} \; H_{k,2} \; H_{k,3}]$ from M C-BTSs belonging to the $\mathcal{C}_{BTS}$ determined at step 61 to the $k^{th}$ AT and calculates the maximum singular vector $\tilde{v}_{k,max}$ of the collaborative channel matrix $\tilde{H}_k$. Also, $k^{th}$ AT estimates the downlink channels $\{H_{k,m}\}_{m=1,2,3}$ from the individual C-BTSs and calculates the maximum singular vectors $\{v_{k,m,max}\}_{m=1,2,3}$ of the matrices.

The optimal vector selector 53 selects a vector most accurately approximating the maximum singular vector $\tilde{v}_{k,max}$ of the collaborative channel matrix $\tilde{H}_k$ from a unitary precoding matrix codebook and feeds back the selected vector.

Steps 63 and 64 of FIG. 7 are performed at each AT.

At step 63, the AT selects a vector most accurately representing the maximum singular vector $v_{k,m,max}$ of the downlink channel matrix of the $m^{th}$ C-BTS, which is estimated at step 62 from a predetermined single cell vector codebook $\mathcal{F}_{single}$, and feeds backs the selected vector to the $m^{th}$ C-BTS using the Precoding Matrix Indicator ($PMI_m$) and Rank Indicator ($RI_m$) for the $m^{th}$ C-BTS. This process is performed to the M C-BTSs belonging to $\mathcal{C}_{BTS}$.

At step 64, the AT selects $n_T$ juncture vectors most accurately presenting $\tilde{v}_{k,max}$ by the $PMI_m$ and $RI_m$ selected per C-BTS in optimal combination with the M vectors indicated in $\mathcal{F}_{single}$, as shown in Equation (2), from $\mathcal{F}_{junct}$, feeds back the index of the unitary precoding matrix to which the selected vector belongs in the form of Juncture Matrix Index ($JMI_n$), and feeds back the index of the vector selected from the matrix indicated by JMI using Juncture Vector Index ($JVI_n$).

At step 65, CQI estimator 54 of the $k^{th}$ AT estimates the receivable SINR, in case that M C-BTSs transmit using the transmission weight vector of size $Mn_T \times 1$ including $\{PMI_m\}_{m=1,\ldots,M}$, $\{RI_m\}_{m=1,\ldots,M}$, $\{JMI_n\}_{n=1,\ldots,n_T}$, and $\{JVI_n\}_{n=1,\ldots,n_T}$, selected at steps 63 and 64, as shown in Equation (2), converts the estimated SINR to CQI information, and feeds back the CQI information to the C-BTSs.

At step 66, the AT scheduled by the joint SDMA precoder processes the $Mn_T$ symbols received on the traffic channels from M C-BTSs to estimate the received data using demodulator 55.

D.3 Structure and Operation of Transmitter for Joint SDMA Using Unitary Precoding Matrix Codebook In this section, a structure and operation of a transmitter for performing the joint SDMA method using a unitary precoding matrix codebook according to an embodiment of the present invention is described.

Figure 8:
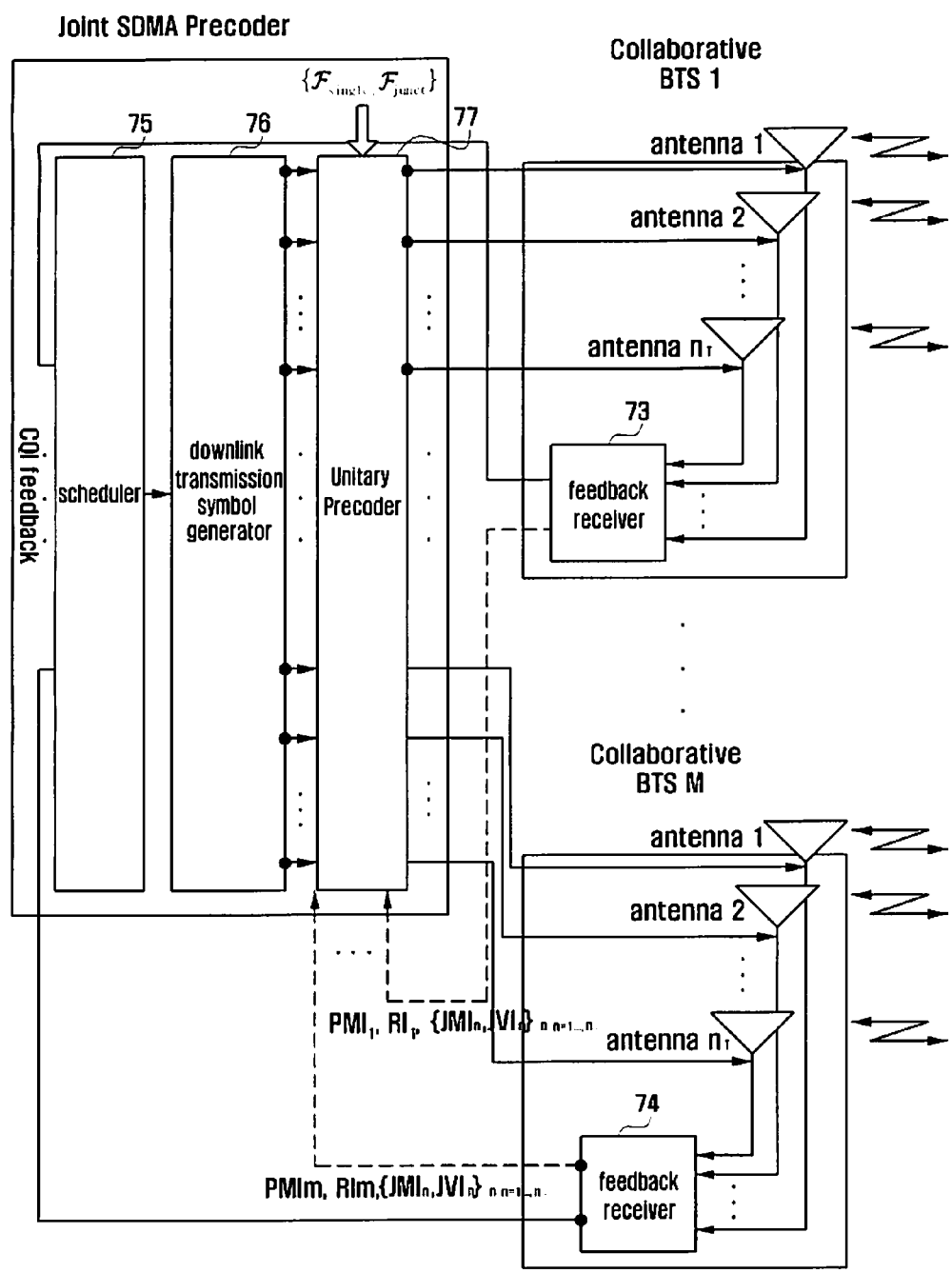
FIG. 8 illustrates a transmitter of an AT for supporting a joint SDMA method using a unitary precoding matrix codebook according to an embodiment of the present invention.
Figure 9:
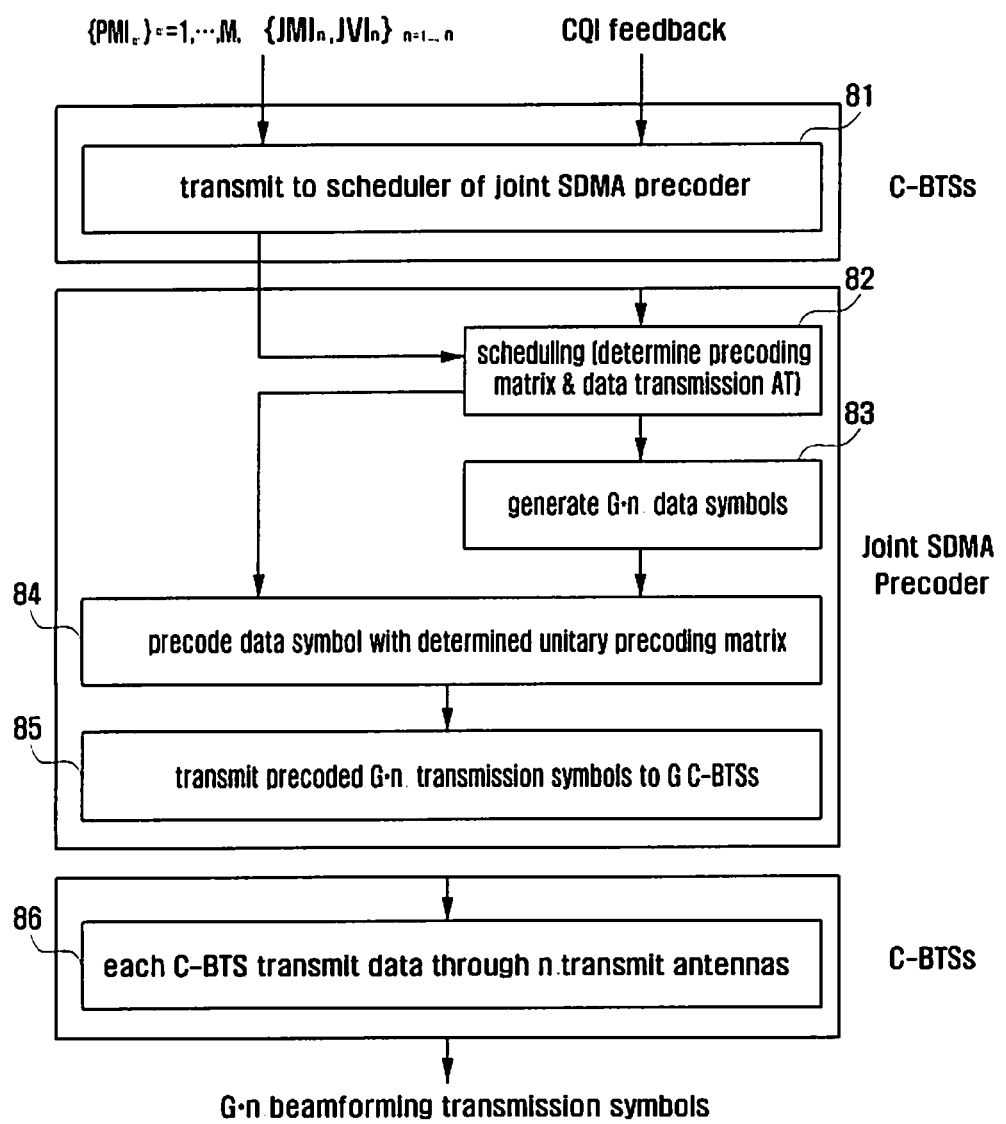
FIG. 9 is a flowchart illustrating a transmission procedure of a joint SDMA method using a provided matrix codebook according to an embodiment of the present invention.

FIG. 8 illustrates a transmitter of an AT for supporting the joint SDMA method using a unitary precoding matrix codebook according to an embodiment of the present invention, and FIG. 9 is a flowchart illustrating a transmission procedure of the joint SDMA method using the provided matrix codebook according to an embodiment of the present invention.

Referring to FIGS. 9 and 9, at step 81, the feedback receivers 73 and 74 of the C-BTSs transfer the received feedback information of $\{PMI_m\}_{m=1,\ldots,M}$, $\{RI_m\}_{m=1,\ldots,M}$, $\{JMI_n\}_{n=1,\ldots,n_T}$, and $\{JVI_n\}_{n=1,\ldots,n_T}$ to the scheduler 75.

At step 82, the scheduler 75 determines maximum M*nT ATs to which data is simultaneously transmitted and the unitary precoding matrix to be used for data transmission based on the feedback information about the maximum singular vector of each AT that is transferred at step 81 and CQI feedback information.

At step 83, the downlink transmission symbol generator 76 generates data symbols to be transmitted with the ATs selected at step 82.

At step 84, the unitary precoder 77 generates beamforming transmission symbol by multiplying the unitary precoding matrix determined at step 82 for data transmission to the transmission symbol generated at step 83.

At step 85, the joint SDMA precoder transfers $Mn_T$ transmission symbols generated at step 84 to M C-BTSs by $n_T$ transmission symbols in sequential order.

At step 86, each C-BTS transmits $n_T$ transmission symbols provided by the joint SDMA precoder through $n_T$ transmit antennas.

E. Performance Comparison Analysis of Method Provided in the Present Invention

The present invention provides a joint SDMA method based on non-unitary precoding and unitary precoding between C-BTSs that maximizes simultaneous data transmission capacity from the C-BTSs to multiple C-ATs using limited feedback information in a collaborative wireless communication network using a MIMO antenna system. In order to analyze the performance of the non-unitary precoding and unitary precoding-based joint SDMA methods, the performances of non-coordination technique performing SDMA per cell and the coordinated scheduling technique performing joint scheduling between C-BTSs are compared in total transmission capacity of the C-BTSs. The considered joint SDMA systems include two C-BTS (i.e., M=2) respectively, the number of transmit antennas of each C-BTS $n_T$ is 2, the distance between antenna is 0.5λ, the number of receive antennas $n_R$ is 2, and it is assumed that the receive antennas are not spatially correlated.

The codebook uses $\mathcal{F}_{single} = \{E_1, E_2\}$ including two DFT matrices for single cell SDMA operation and uses the IEEE802.16e 3 bits Grassmannian codebook including 0 matrix like $\mathcal{F}_{junct} = \{0, U_1, \ldots U_8\}$ as the juncture codebook. For the joint SDMA method using the provided unitary precoding technique, it is assumed that the two C-BTSs uses a total of 256 or 128 CQIs.

Figure 10:
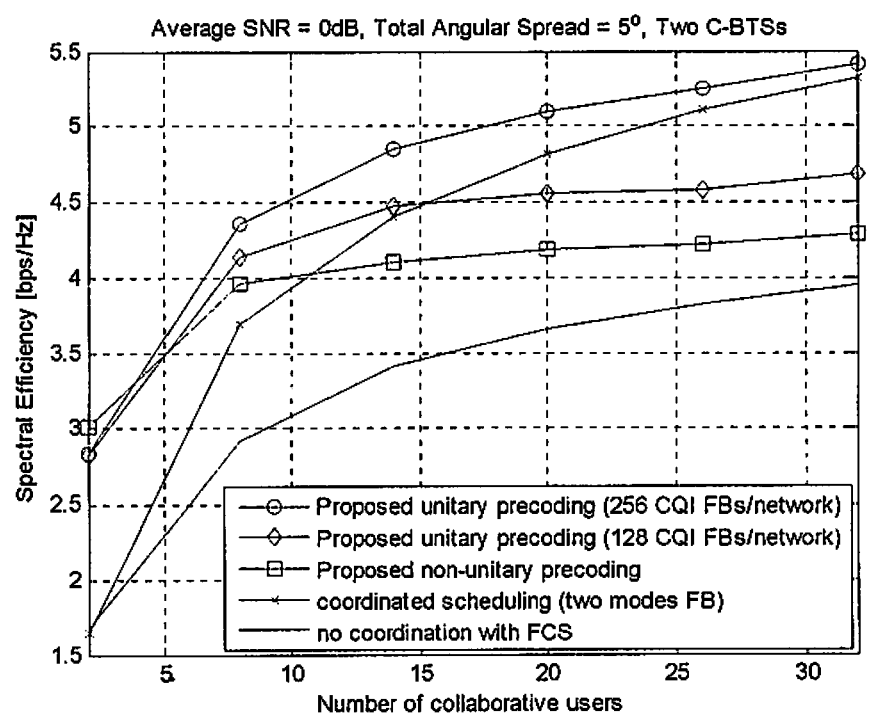
FIG. 10 is a graph illustrating performance comparison results of joint SDMA methods based on non-unitary precoding and unitary precoding in transmission throughput.

FIG. 10 is a graph illustrating performance comparison results of the joint SDMA methods based on non-unitary precoding and unitary precoding in transmission throughput.

Referring to FIG. 10, across a range of C-AT numbers in a real system (K<15), it is shown that both the joint SDMA methods using the unitary precoding and non-unitary precoding techniques are superior to the coordinated scheduling technique, and no coordination technique in transmission capacity. When the number of C-ATs is less than 5, the non-unitary precoding-based SDMA method shows high transmission capacity as compared to the unitary precoding-based SDMA method. However, when the number of C-ATs is greater than 5, the transmission capacity the unitary precoding-based joint SDMA method becomes greater than that of the non-unitary precoding-based joint SDMA method. From this analysis result, it is known that both the unitary precoding-based joint SDMA and non-unitary precoding-based joint SDMA increase the simultaneous data transmission capacity from the C-BTSs to multiple C-ATs using limited feedback information.

As described above, the present invention provides a joint SDMA method between C-BTSs that is capable of maximizing simultaneous data transmission capacity from C-BTSs to multiple C-ATs using a limited amount of feedback information in the collaborative wireless communication network using a MIMO antenna system.

As described above, the joint SDMA method of the present invention is capable of adjusting transmission weights to be multiplied to data streams that are simultaneously transmitted by all of the C-BTSs in order to maximize transmission gain over downlink channels from all of the C-BTSs to a single AT, while minimizing inter-cell interference, thereby increasing throughput of data simultaneously transmitted by the C-BTSs in a high ICI environment.

Additionally, the joint SDMA method of the present invention designs a single cell SDMA codebook to represent maximum singular vectors of correlated individual C-BTSs downlink channels and a juncture codebook representing maximum singular vectors of uncorrelated downlink channels of the different C-BTSs in order to be optimized to the block correlated channel characteristics of the downlink channels between the C-BTSs and each AT, and effectively combines the matrices and vectors belonging to the single cell SDMA codebook and juncture codebook in order to secure superior performance in the collaborative communication channel environment having coexistent spatial correlation characteristics.

Further, the joint SDMA method of the present invention is capable of obtaining significant throughput gain only with partial channel information fed back by the C-ATs through limited feedback channel in uplink.

As described above, the joint SDMA method of the present invention enables each AT to accurately feed back a maximum singular vector of a collaborative channel matrix to a transmitter and enables the feedback vectors to form a unitary transmission precoding matrix such that it operates with non-unitary precoding algorithm, when the number of ATs to which the data are transmitted is small, and operates with unitary precoding algorithm, when the number of ATs to which the data are transmitted increases, resulting in increased system throughput.

Although certain embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A channel condition information feedback method for a terminal in a collaborative wireless communication network using a multiple input multiple output antenna system, the method comprising:

grouping M adjacent base stations that are capable of collaborative communication;

acquiring a maximum singular vector by estimating downlink channels from base stations belonging to a same group;

selecting at least one weight vector $v_{k,m,max}$ for each of the M adjacent base stations most accurately representing to the maximum singular vector;

selecting information corresponding to at least one complex variable $g_{k,m}$ for each of the M adjacent base stations, so that the result of combination of the at least one weight vector $v_{k,m,max}$ and the at least one complex variable $g_{k,m}$ is most accurately representing to the maximum singular vector; and feeding back the weight vector and the information, wherein, $$\bar{v}_{k,max} \begin{vmatrix} g_{k,1}v_{k,1,max} \\ \vdots \\ g_{k,M}v_{k,M,max} \end{vmatrix}$$

$\bar{v}_{k,max}$ is the maximum singular vector of $\bar{H}_k$, which is an $n_R$ $Mn_T$ collaborative channel matrix from the M adjacent base stations to a $k^{th}$ terminal, where $n_R$ is the number of receive antennas for each terminal, $n_T$ is the number of transmit antennas for each adjacent base station, and M is the total number of adjacent base stations in the same group;

$V_{k,m,max}$ is the maximum singular vector of size $n_T$ 1 of a downlink channel $H_{k,m}$, which is an $n_R$ $n_T$ complex channel matrix from an $m^{th}$ base station to a $k^{th}$ terminal; and $g_{k,m}$ is the complex variable, where $\sqrt{g_{k,1}^2+g_{k,2}^2+...+g_{k,M}^2}=1$.

2. The method of claim 1, wherein the at least one weight vector is selected from a single cell vector codebook designed to represent singular vectors of downlink channels of correlated base stations.

3. The method of claim 2, wherein the single cell vector codebook includes a single cell Space Division Multiple Access (SDMA) codebook.

4. The method of claim 1, wherein the information is selected from a juncture vector codebook designed to have isotropic distribution in a certain dimensional complex vector space.

5. The method of claim 1, wherein the information includes a quantized size and a phase of the complex variable.

6. The method of claim 1, further comprising:
estimating a receivable Signal to Interference and Noise Ratio (SINR); and
feeding back a channel quality indicator corresponding to the estimated SINR.

7. The method of claim 1, further comprising receiving, from the base station, transmission symbols combined with a transmission precoding matrix determined based on feedback information.

8. The method of claim 1, wherein the at least one weight vector is selected from a single cell matrix codebook designed to represent singular vectors of downlink channels of correlated base stations, the single cell matrix codebook being orthonormal.

9. The method of claim 1, wherein the information is selected from a juncture matrix codebook designed to represent singular vectors of downlink channels of uncorrelated base stations,
wherein the juncture matrix codebook is orthonormal, and vectors included in the juncture matrix codebook have isotropic distribution in a certain complex vector space.

10. The method of claim 9, wherein the juncture matrix codebook includes a unitary matrix and a zero matrix, and
wherein a transmission rank is adjusted according to which of the unitary and zero matrices is selected.

11. A channel condition information feedback apparatus for a collaborative wireless communication network using a multiple input multiple output antenna system, comprising:
a downlink channel estimator that estimates channels of adjacent base stations, groups base stations from among the M adjacent base stations that are capable of collaborative communication, and obtains a maximum singular vector for each of the M adjacent base stations belonged to a same group; and
a vector selector that selects at least one weight vector $v_{k,m,max}$ for each of the M adjacent most accurately representing to the maximum singular vector and information corresponding to at least one complex variable $g_{k,m}$ for each of the M adjacent base stations, so that the result of combination of the at least one weight vector $v_{k,m,max}$ and the at least one complex variable $g_{k,m}$ is most accurately representing to the maximum singular vector, and feeds back the weight vector and the information, wherein, $$\bar{v}_{k,max} \begin{vmatrix} g_{k,1} v_{k,1,max} \\ \vdots \\ g_{k,M} v_{k,M,max} \end{vmatrix}$$

$\bar{v}_{k,max}$ is the maximum singular vector of $\overline{H}_k$, which is an $n_R$ $Mn_T$ collaborative channel matrix from the M adjacent base stations to a $k^{th}$ terminal, where $n_R$ is the number of receive antennas for each terminal, $n_T$ is the number of transmit antennas for each adjacent base station, and M is the total number of adjacent base stations in the same group;

$V_{k,m,max}$ is the maximum singular vector of size $n_T$ 1 of a downlink channel $H_{k,m}$, which is an $n_R$ $n_T$ complex channel matrix from an $m^{th}$ base station to a $k^{th}$ terminal; and $g_{k,m}$ is the complex variable, where $\sqrt{g_{k,1}^2+g_{k,2}^2+...+g_{k,M}^2}=1$.

12. The apparatus of claim 11, wherein the vector selector selects the at least one weight vector from a single cell vector codebook designed to represent singular vectors of downlink channels of correlated base stations.

13. The apparatus of claim 12, wherein the single cell vector codebook comprises a single cell Space Division Multiple Access (SDMA) codebook.

14. The apparatus of claim 11, wherein the vector selector selects the information from a juncture vector codebook designed to represent singular vectors of downlink channels of uncorrelated base stations.

15. The apparatus of claim 14, wherein the vector selector feeds back the information including a quantized size and a phase of the complex variable.

16. The apparatus of claim 11, further comprising a CQI estimator that estimates a receivable Signal to Interference and Noise Ratio (SINR), selects a Channel Quality Indicator (CQI) corresponding to estimated SINR, and feeds back the CQI.

17. The apparatus of claim 11, wherein the vector selector selects the weight vector from a single cell matrix codebook designed to represent singular vectors of downlink channels of correlated base stations, the single cell matrix codebook being orthonormal.

18. The apparatus of claim 11, wherein the vector selector selects the information from a juncture matrix codebook designed to represent singular vector of downlink channels of uncorrelated base stations,
wherein the juncture matrix codebook is orthonormal, and
wherein vectors included in the juncture matrix codebook have isotropic distribution in a certain complex vector space.

19. The apparatus of claim 18, wherein the juncture matrix codebook comprises:
a unitary matrix; and
a zero matrix,
wherein a transmission rank is adjusted according to which of the unitary and zero matrices is selected.

20. A channel condition information feedback method for a terminal in a collaborative wireless communication network using a multiple input multiple output antenna system, the method comprising:
selecting one or more weight vector indices most accurately representing a maximum singular vector $v_{k,m,max}$ for each of M collaborative base transceiver station (C-BTS) in the same collaborative group;
selecting one or more complex variable indices most accurately representing a complex Gaussian random variable $g_{k,m}$ to be multiplied by the maximum singular vector $v_{k,m,max}$ for each of M collaborative base transceiver station (C-BTS) in the same collaborative group; and feeding back the one or more weight vector indices and the one or more complex variable indices for joint Space Division Multiple Access (SDMA) precoding of the downlink channels of the M collaborative base transceiver station (C-BTS) in the same collaborative group; wherein $$\bar{v}_{k,max} \begin{vmatrix} g_{k,1}v_{k,1,max} \\ \vdots \\ g_{k,M}v_{k,M,max} \end{vmatrix}$$

$\bar{v}_{k,max}$ is the maximum singular vector of $\bar{H}_k$, which is an $n_R$ $Mn_T$ collaborative channel matrix from M C-BTSs to a $k^{th}$ Access Terminal (AT), where $n_R$ is the number of receive antennas for each AT, $n_T$ is the number of transmit antennas for each C-BTS, and M is the total number of C-BTSs in the collaborative group;

$V_{k,m,max}$ is the maximum singular vector of size $n_T$ 1 of a downlink channel $H_{k,m}$, which is an $n_R$ $n_T$ complex channel matrix from an $m^{th}$ C-BTS to a $k^{th}$ Access Terminal (AT); and $g_{k,m}$ is a complex Gaussian random variable, where $\sqrt{g_{k,1}^2 + g_{k,2}^2 + ... + g_{k,M}^2} = 1$.

21. The method of claim 20, wherein the vector $g_k = [g_{k,1}, \ldots, g_{k,M}]^T$ having the complex Gaussian random variables $\{g_{k,m}\}_{m=1,\ldots,M}$ as its elements represents a singular vector of the downlink channels between uncorrelated C-BTSs.

22. The method of claim 20, wherein the one or more weight vector indices are selected using a single cell matrix codebook.

23. The method of claim 20, wherein the one or more weight vector indices comprise a Precoding Matrix Indicator ($PMI_m$) and a Rank Indicator ($RI_m$).

24. The method of claim 20, wherein the one or more complex variable vector indices are selected using a juncture codebook.

25. The method of claim 20, wherein the one or more complex variable vectors comprise a Juncture Codebook Indicator (JCI) and a Juncture Vector Index (JVI).

26. The method of claim 20, wherein the one or more complex variable vector indices approximate the size and phase values of the complex variables.

27. The method of claim 26, wherein the one or more complex variable vectors comprise a Quantized Amplitude Index (QAI) and a Quantized Phase Index (QPI).

28. The method of claim 20, wherein the maximum singular vectors $v_{k,m,max}$ for each of the M C-BTS in the same collaborative group are correlated, and the complex Gaussian random variables $g_{k,m}$ to be multiplied by each of the maximum singular vectors $v_{k,m,max}$ represent uncorrelated downlink channels of BTSs not in the same collaborative group.

29. The method of claim 1, wherein all of the at least one singular vector are correlated and all of the at least one complex variable are uncorrelated.

30. The method of claim 29, wherein the correlated at least one singular vector represents downlink channels of base stations belonging to the same group and the uncorrelated at least one complex variable represents downlink channels from base stations not belonging to the same group.

* * * * *